(12) United States Patent
O'Donnell et al.

(10) Patent No.: US 12,480,719 B2
(45) Date of Patent: Nov. 25, 2025

(54) THERMAL ENERGY STORAGE SYSTEM FOR SIMPLE AND COMBINED CYCLE POWER GENERATION

(71) Applicant: Rondo Energy, Inc., Alameda, CA (US)

(72) Inventors: John Setel O'Donnell, Oakland, CA (US); Rahul Terdalkar, Lake Mary, FL (US); Yusef Desjardins Ferhani, Menlo Park, CA (US); Colin Riley, Overland Park, KS (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 19/189,085

(22) Filed: Apr. 24, 2025

(65) Prior Publication Data

US 2025/0334350 A1    Oct. 30, 2025

Related U.S. Application Data

(60) Provisional application No. 63/638,363, filed on Apr. 24, 2024.

(51) Int. Cl.
*F28D 20/02*     (2006.01)
*F01K 3/00*      (2006.01)
(Continued)

(52) U.S. Cl.
CPC ............ *F28D 20/028* (2013.01); *F01K 3/006* (2013.01); *F01K 3/186* (2013.01); *F01K 13/00* (2013.01);
(Continued)

(58) Field of Classification Search
CPC .... F01K 3/00–267; F01K 23/10; F01K 23/18; F01K 13/00; F01K 13/02; F02C 6/14; Y02E 60/14; F28D 20/00–028
See application file for complete search history.

(56) References Cited

U.S. PATENT DOCUMENTS

| 1,089,951 A | 3/1914 | Otto |
| 1,700,542 A | 1/1929 | O'Donnell |

(Continued)

FOREIGN PATENT DOCUMENTS

| AU | 2012292959 B2 | 2/2016 |
| AU | 2016100264 A4 | 4/2016 |

(Continued)

OTHER PUBLICATIONS

"Ethylene Production via Cracking of Ethane-Propane", Chemical Engineering, Nov. 1, 2015, Total pp. 4.
(Continued)

*Primary Examiner* — Laert Dounis
(74) *Attorney, Agent, or Firm* — Procopio, Cory, Hargreaves & Savitch LLP; Matt Rainey

(57) ABSTRACT

A thermal energy storage (TES) system converts variable renewable electricity (VRE) to continuous heat at over 900° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. Configurations of simple cycle systems and combined cycle power plants using thermal energy storage units can provide even greater efficiency and responsiveness.

44 Claims, 19 Drawing Sheets

(51) Int. Cl.
  *F01K 3/18*   (2006.01)
  *F01K 13/00*  (2006.01)
  *F01K 13/02*  (2006.01)
  *F01K 23/10*  (2006.01)
  *F01K 23/18*  (2006.01)
  *F02C 6/14*   (2006.01)
  *F28D 20/00*  (2006.01)

(52) U.S. Cl.
  CPC .............. *F01K 13/02* (2013.01); *F01K 23/10* (2013.01); *F01K 23/18* (2013.01); *F02C 6/14* (2013.01); *F28D 2020/0078* (2013.01); *Y02E 20/16* (2013.01); *Y02E 60/14* (2013.01)

(56) References Cited

U.S. PATENT DOCUMENTS

| | | | |
|---|---|---|---|
| 1,700,642 | A | 1/1929 | Meindersma |
| 2,833,532 | A | 5/1958 | Ries |
| 3,381,113 | A | 4/1968 | Jacques et al. |
| 3,549,136 | A | 12/1970 | Baab et al. |
| 3,788,066 | A | 1/1974 | Nebgen |
| 3,908,381 | A | 9/1975 | Barber et al. |
| 3,995,434 | A | 12/1976 | Kato et al. |
| 4,110,987 | A | 9/1978 | Cahn et al. |
| 4,124,061 | A | 11/1978 | Mitchell et al. |
| 4,127,161 | A | 11/1978 | Clyne et al. |
| 4,146,057 | A | 3/1979 | Friedman et al. |
| 4,172,442 | A | 10/1979 | Boblitz |
| 4,200,783 | A | 4/1980 | Ehret |
| 4,222,365 | A | 9/1980 | Thomson |
| 4,234,782 | A | 11/1980 | Barabas et al. |
| 4,237,692 | A | 12/1980 | Ahrens et al. |
| 4,312,324 | A | 1/1982 | Ross et al. |
| 4,329,592 | A | 5/1982 | Wagner et al. |
| 4,397,962 | A | 8/1983 | Schockmel |
| 4,438,630 | A | 3/1984 | Rowe |
| 4,524,756 | A | 6/1985 | Laverman |
| 4,651,810 | A | 3/1987 | Triessnig |
| 4,809,523 | A | 3/1989 | Vandenberg |
| 4,874,034 | A | 10/1989 | Hirata et al. |
| 5,154,224 | A | 10/1992 | Yasui et al. |
| 5,286,472 | A | 2/1994 | Fulford |
| 5,384,489 | A | 1/1995 | Bellac |
| 5,416,416 | A | 5/1995 | Bisher |
| 5,419,388 | A | 5/1995 | Hickel et al. |
| 5,553,604 | A | 9/1996 | Frei |
| 5,634,313 | A | 6/1997 | Mögling |
| 5,924,477 | A | 7/1999 | Doru |
| 6,274,855 | B1 | 8/2001 | Tatematsu et al. |
| 6,302,188 | B1 | 10/2001 | Ruhl et al. |
| 6,322,356 | B1 | 11/2001 | Gupta et al. |
| 6,631,754 | B1 | 10/2003 | Bremont et al. |
| 7,213,409 | B1 | 5/2007 | Nuckols |
| 7,693,402 | B2 | 4/2010 | Hudson et al. |
| 8,226,917 | B2 | 7/2012 | Fan et al. |
| 8,544,275 | B2 | 10/2013 | Shinnar |
| 8,701,773 | B2 | 4/2014 | O'Donnell et al. |
| 8,960,182 | B2 | 2/2015 | Magaldi et al. |
| 9,370,044 | B2 | 6/2016 | McDonald |
| 9,512,826 | B2 | 12/2016 | Rodionov et al. |
| 9,556,708 | B2 | 1/2017 | Schneider et al. |
| 9,816,490 | B2 | 11/2017 | Conlon |
| 9,816,491 | B2 | 11/2017 | Perry |
| 9,948,140 | B2 | 4/2018 | Pietsch et al. |
| 9,989,271 | B1 | 6/2018 | Becker |
| 10,113,535 | B2 | 10/2018 | Conlon |
| 10,345,050 | B2 | 7/2019 | Pietsch et al. |
| 10,527,026 | B2 | 1/2020 | Muir et al. |
| 10,767,935 | B2 | 9/2020 | Bergan et al. |
| 10,775,111 | B2 | 9/2020 | Kerth |
| 10,876,521 | B2 | 12/2020 | Anderson et al. |
| 11,352,951 | B2 | 6/2022 | Apte et al. |
| 11,391,181 | B2 | 7/2022 | O'Donnell et al. |
| 11,459,944 | B2 | 10/2022 | Robinson |
| 11,480,160 | B1 | 10/2022 | Mokheimer et al. |
| 11,603,776 | B2 | 3/2023 | O'Donnell et al. |
| 11,809,153 | B1 | 11/2023 | Kearns et al. |
| 11,994,347 | B2 | 5/2024 | Ponec et al. |
| 2003/0101728 | A1* | 6/2003 | Wakana ............. F25J 1/0251 60/727 |
| 2003/0113255 | A1 | 6/2003 | Harlan |
| 2004/0062063 | A1 | 4/2004 | Siri |
| 2004/0099261 | A1 | 5/2004 | Litwin |
| 2004/0148922 | A1 | 8/2004 | Pinkerton |
| 2004/0182081 | A1 | 9/2004 | Sim et al. |
| 2004/0211215 | A1 | 10/2004 | Maier-Laxhuber et al. |
| 2005/0095500 | A1 | 5/2005 | Sun et al. |
| 2005/0126172 | A1 | 6/2005 | Hudson et al. |
| 2006/0107664 | A1 | 5/2006 | Hudson et al. |
| 2006/0174622 | A1 | 8/2006 | Skowronski |
| 2006/0179840 | A1 | 8/2006 | Murphy et al. |
| 2006/0211777 | A1 | 9/2006 | Severinsky |
| 2006/0266039 | A1 | 11/2006 | Skowronski et al. |
| 2006/0277910 | A1 | 12/2006 | Hoetger |
| 2007/0209365 | A1 | 9/2007 | Hamer et al. |
| 2007/0220889 | A1 | 9/2007 | Nayef et al. |
| 2008/0000231 | A1 | 1/2008 | Litwin et al. |
| 2008/0066736 | A1 | 3/2008 | Zhu |
| 2008/0127647 | A1 | 6/2008 | Leitner |
| 2008/0134681 | A1 | 6/2008 | Nayef et al. |
| 2008/0279761 | A1 | 11/2008 | Kimura et al. |
| 2009/0038668 | A1 | 2/2009 | Plaisted |
| 2009/0090109 | A1 | 4/2009 | Mills et al. |
| 2009/0117633 | A1 | 5/2009 | Bradley et al. |
| 2009/0208402 | A1 | 8/2009 | Rossi |
| 2009/0320828 | A1 | 12/2009 | Koketsu et al. |
| 2010/0101462 | A1 | 4/2010 | Hayashi et al. |
| 2010/0132391 | A1 | 6/2010 | Barot |
| 2010/0178156 | A1 | 7/2010 | Rivas Cortes et al. |
| 2010/0195357 | A1 | 8/2010 | Fornage et al. |
| 2010/0229523 | A1 | 9/2010 | Holt et al. |
| 2010/0251711 | A1 | 10/2010 | Howes et al. |
| 2010/0295306 | A1 | 11/2010 | Ridnik et al. |
| 2011/0083443 | A1 | 4/2011 | Jockenhoevel et al. |
| 2011/0226440 | A1 | 9/2011 | Bissell et al. |
| 2011/0247335 | A1 | 10/2011 | Schmid et al. |
| 2011/0277469 | A1 | 11/2011 | Brenmiller et al. |
| 2011/0286902 | A1 | 11/2011 | Fan et al. |
| 2011/0289924 | A1 | 12/2011 | Pietsch |
| 2012/0067047 | A1 | 3/2012 | Peterson et al. |
| 2012/0102950 | A1 | 5/2012 | Turchi |
| 2012/0131898 | A1 | 5/2012 | Mokheimer et al. |
| 2012/0151926 | A1 | 6/2012 | Labbe |
| 2012/0167559 | A1 | 7/2012 | Havel |
| 2012/0167567 | A1* | 7/2012 | Kleine ............. F01K 13/02 60/645 |
| 2012/0241677 | A1 | 9/2012 | Perkins et al. |
| 2012/0255309 | A1 | 10/2012 | Venetos et al. |
| 2012/0286524 | A1 | 11/2012 | Bronicki |
| 2013/0025817 | A1 | 1/2013 | Callaghan |
| 2013/0047976 | A1 | 2/2013 | Kaftori |
| 2013/0081394 | A1 | 4/2013 | Perry |
| 2013/0081395 | A1 | 4/2013 | Frey et al. |
| 2013/0118169 | A1 | 5/2013 | Milam et al. |
| 2013/0175006 | A1 | 7/2013 | Robinson et al. |
| 2013/0227947 | A1 | 9/2013 | Bronicki et al. |
| 2014/0004469 | A1 | 1/2014 | Recourt et al. |
| 2014/0008033 | A1 | 1/2014 | Howes et al. |
| 2014/0053554 | A1 | 2/2014 | Tartibi et al. |
| 2014/0074314 | A1 | 3/2014 | Niknafs et al. |
| 2014/0102073 | A1* | 4/2014 | Pang ............. F01K 3/00 60/659 |
| 2014/0110080 | A1 | 4/2014 | Bergan |
| 2014/0116069 | A1 | 5/2014 | Peterson et al. |
| 2014/0190469 | A1 | 7/2014 | O'Donnell et al. |
| 2014/0216717 | A1 | 8/2014 | O'Donnell et al. |
| 2014/0223906 | A1 | 8/2014 | Gee et al. |
| 2014/0224469 | A1 | 8/2014 | Mirmobin et al. |
| 2014/0366536 | A1 | 12/2014 | Muren |
| 2015/0007577 | A1* | 1/2015 | Li ............. F01K 23/04 60/39.182 |
| 2015/0033740 | A1 | 2/2015 | Anderson et al. |
| 2015/0053266 | A1 | 2/2015 | Chen et al. |

(56) References Cited

U.S. PATENT DOCUMENTS

| | | |
|---|---|---|
| 2015/0143806 A1 | 5/2015 | Friesth |
| 2015/0143811 A1 | 5/2015 | Pang et al. |
| 2015/0167489 A1* | 6/2015 | Heiligenstein .......... H02J 3/381 |
| | | 290/52 |
| 2015/0176920 A1 | 6/2015 | Vendeirinho |
| 2015/0224850 A1 | 8/2015 | Bank et al. |
| 2015/0267566 A1* | 9/2015 | Vamvas .................. F28D 20/02 |
| | | 60/659 |
| 2015/0276234 A1 | 10/2015 | Muro et al. |
| 2015/0295508 A1 | 10/2015 | Conry |
| 2015/0354545 A1 | 12/2015 | Conlon |
| 2016/0130709 A1 | 5/2016 | Hong et al. |
| 2016/0146110 A1 | 5/2016 | Hackstein et al. |
| 2016/0164451 A1 | 6/2016 | Lenert et al. |
| 2016/0208657 A1 | 7/2016 | Brückner et al. |
| 2016/0214910 A1 | 7/2016 | King |
| 2016/0281607 A1* | 9/2016 | Asati ........................ F02C 7/26 |
| 2016/0301093 A1 | 10/2016 | Bosmann et al. |
| 2016/0355932 A1 | 12/2016 | Reytier et al. |
| 2017/0051949 A1 | 2/2017 | Uselton |
| 2017/0058768 A1 | 3/2017 | Bergins et al. |
| 2017/0093163 A1 | 3/2017 | Johnson et al. |
| 2017/0204741 A1 | 7/2017 | Hogen et al. |
| 2017/0241649 A1 | 8/2017 | Cave |
| 2017/0241669 A1 | 8/2017 | von Behrens |
| 2017/0283713 A1 | 10/2017 | Stephens et al. |
| 2017/0362090 A1 | 12/2017 | Melsert et al. |
| 2017/0362724 A1 | 12/2017 | Planque et al. |
| 2018/0003445 A1 | 1/2018 | Bergan et al. |
| 2018/0028967 A1 | 2/2018 | Balfe et al. |
| 2018/0038352 A1 | 2/2018 | Conlon |
| 2018/0073777 A1 | 3/2018 | O'Donnell et al. |
| 2018/0083449 A1 | 3/2018 | Green |
| 2018/0106165 A1 | 4/2018 | Barmeier |
| 2018/0106739 A1 | 4/2018 | Esmaili et al. |
| 2018/0163574 A1 | 6/2018 | Bailcy et al. |
| 2018/0179955 A1 | 6/2018 | Apte et al. |
| 2018/0207557 A1 | 7/2018 | Nellis |
| 2018/0216010 A1 | 8/2018 | Hong |
| 2018/0231316 A1 | 8/2018 | Watremetz et al. |
| 2018/0238563 A1 | 8/2018 | Stepa et al. |
| 2018/0245485 A1 | 8/2018 | Conlon |
| 2018/0292097 A1 | 10/2018 | Specter |
| 2018/0347406 A1 | 12/2018 | Friesth |
| 2018/0372337 A1 | 12/2018 | Walker |
| 2018/0372420 A1 | 12/2018 | Ahadi et al. |
| 2019/0003308 A1 | 1/2019 | Laughlin |
| 2019/0043624 A1 | 2/2019 | Fork et al. |
| 2019/0045617 A1 | 2/2019 | Fork et al. |
| 2019/0096535 A1 | 3/2019 | Olshansky et al. |
| 2019/0140477 A1 | 5/2019 | Yang et al. |
| 2019/0162482 A1 | 5/2019 | Kerth |
| 2019/0170436 A1 | 6/2019 | De et al. |
| 2019/0186786 A1 | 6/2019 | Neiser |
| 2019/0226462 A1 | 7/2019 | Conlon |
| 2019/0245224 A1 | 8/2019 | Lacroix et al. |
| 2019/0331098 A1 | 10/2019 | von Behrens et al. |
| 2019/0359894 A1 | 11/2019 | Heidel et al. |
| 2020/0095984 A1 | 3/2020 | Karni et al. |
| 2020/0124356 A1 | 4/2020 | Ma et al. |
| 2020/0136202 A1 | 4/2020 | Trawick |
| 2020/0172815 A1 | 6/2020 | Stephens et al. |
| 2020/0217518 A1 | 7/2020 | Field et al. |
| 2020/0232345 A1 | 7/2020 | Zwinkels |
| 2020/0251909 A1 | 8/2020 | Falk et al. |
| 2020/0332201 A1 | 10/2020 | Koseoglu et al. |
| 2020/0346165 A1 | 11/2020 | Lu et al. |
| 2020/0358112 A1 | 11/2020 | Chatroux et al. |
| 2020/0378599 A1 | 12/2020 | Risseeuw et al. |
| 2020/0386447 A1 | 12/2020 | Wang |
| 2021/0053689 A1 | 2/2021 | Lynn et al. |
| 2021/0094834 A1 | 4/2021 | Chen et al. |
| 2021/0143446 A1 | 5/2021 | Ponec et al. |
| 2021/0172685 A1 | 6/2021 | Bergan et al. |
| 2021/0190044 A1 | 6/2021 | Anderson et al. |
| 2021/0207527 A1 | 7/2021 | Robinson |
| 2021/0211066 A1 | 7/2021 | Vavilpalli et al. |
| 2021/0325069 A1 | 10/2021 | Cotton et al. |
| 2021/0328544 A1 | 10/2021 | Johnson |
| 2022/0049615 A1 | 2/2022 | Truong |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1 | 4/2022 | Forsberg et al. |
| 2022/0146205 A1 | 5/2022 | Eronen et al. |
| 2022/0170386 A1 | 6/2022 | O'Donnell et al. |
| 2022/0170388 A1* | 6/2022 | O'Donnell .......... F28D 20/0056 |
| 2022/0228271 A1 | 7/2022 | Ashok et al. |
| 2022/0228772 A1 | 7/2022 | Murata et al. |
| 2022/0268179 A1 | 8/2022 | O'Donnell et al. |
| 2022/0290929 A1 | 9/2022 | Doerbeck |
| 2022/0307386 A1 | 9/2022 | Savic et al. |
| 2022/0403759 A1 | 12/2022 | Stapp, III et al. |
| 2023/0052951 A1* | 2/2023 | Migl ....................... F01K 23/10 |
| 2023/0216297 A1 | 7/2023 | Peri et al. |
| 2023/0296034 A1* | 9/2023 | O'Donnell ........ H01M 8/04014 |
| 2023/0407186 A1 | 12/2023 | Sundaram et al. |
| 2024/0092646 A1 | 3/2024 | Isobe et al. |
| 2025/0026986 A1 | 1/2025 | Zellhuber et al. |

FOREIGN PATENT DOCUMENTS

| | | | |
|---|---|---|---|
| AU | 2016204109 B2 | 5/2018 | |
| CH | 703751 A1 | 3/2012 | |
| CN | 1559893 A | 1/2005 | |
| CN | 101799200 A | 8/2010 | |
| CN | 101592439 B | 4/2011 | |
| CN | 104242433 A | 12/2014 | |
| CN | 104296577 B | 4/2016 | |
| CN | 105605957 A | 5/2016 | |
| CN | 105948037 A | 9/2016 | |
| CN | 106052451 A | 10/2016 | |
| CN | 106247836 A | 12/2016 | |
| CN | 107246732 A | 10/2017 | |
| CN | 107872196 A | 4/2018 | |
| CN | 108167034 A * | 6/2018 | .............. F01K 11/02 |
| CN | 108204760 A | 6/2018 | |
| CN | 108362151 A | 8/2018 | |
| CN | 108362152 A | 8/2018 | |
| CN | 108612634 A | 10/2018 | |
| CN | 106767074 B | 12/2018 | |
| CN | 109883241 A | 6/2019 | |
| CN | 110411260 A | 11/2019 | |
| CN | 111256364 A | 6/2020 | |
| CN | 210802160 U | 6/2020 | |
| CN | 211183438 U | 8/2020 | |
| CN | 111655989 A | 9/2020 | |
| CN | 110725725 B * | 12/2020 | ................ F22B 1/18 |
| CN | 112113203 A | 12/2020 | |
| CN | 212157096 U | 12/2020 | |
| CN | 113835372 A | 12/2021 | |
| CN | 114754617 A | 7/2022 | |
| DE | 19808810 C1 | 6/1999 | |
| DE | 10029732 A1 | 1/2002 | |
| DE | 102008051384 B3 * | 2/2010 | ................ F02C 1/05 |
| DE | 102009020531 B3 | 4/2011 | |
| DE | 102012024526 B4 | 9/2014 | |
| DE | 102013212981 A1 | 1/2015 | |
| DE | 102017212684 A1 | 1/2019 | |
| EP | 79247 A1 | 5/1983 | |
| EP | 794161 B1 | 2/2003 | |
| EP | 1930587 A2 | 6/2008 | |
| EP | 2372116 A | 10/2011 | |
| EP | 2722496 A2 | 4/2014 | |
| EP | 3081770 A1 | 10/2016 | |
| EP | 3324018 A1 | 5/2018 | |
| EP | 3486594 A1 | 5/2019 | |
| EP | 2837086 B1 | 11/2019 | |
| EP | 3245388 B1 | 11/2019 | |
| EP | 3725917 A1 | 10/2020 | |
| EP | 2909547 B1 | 9/2021 | |
| EP | 3642296 B1 | 1/2022 | |
| GB | 2109026 A | 5/1983 | |
| GB | 2152652 A | 8/1985 | |

(56) References Cited

FOREIGN PATENT DOCUMENTS

| | | |
|---|---|---|
| GB | 2477801 A | 8/2011 |
| IL | 284451 | 8/2021 |
| JP | 2006145200 A | 6/2006 |
| KR | 2001-0100320 A | 11/2001 |
| KR | 102308531 B1 | 10/2021 |
| MA | 40029 A | 12/2015 |
| TW | 202100240 A | 1/2021 |
| WO | WO 1980/000170 | 2/1980 |
| WO | WO 2007/108014 A1 | 9/2007 |
| WO | WO 2008/052249 A1 | 5/2008 |
| WO | WO 2008/108870 A1 | 9/2008 |
| WO | WO 2009/152562 A1 | 12/2009 |
| WO | WO 2011/066039 A1 | 6/2011 |
| WO | WO 2011/077248 A2 | 6/2011 |
| WO | WO 2011/109514 A1 | 9/2011 |
| WO | WO 2012/123853 A1 | 9/2012 |
| WO | WO 2012/127178 A1 | 9/2012 |
| WO | WO 2012/150969 A1 | 11/2012 |
| WO | WO 2013/020176 A1 | 2/2013 |
| WO | WO 2014/063191 A1 | 5/2014 |
| WO | WO 2014/151843 A2 | 9/2014 |
| WO | WO-2015149124 A1 * 10/2015 ............ F28F 21/02 |
| WO | WO 2015/187423 A2 | 12/2015 |
| WO | WO 2016/065191 A1 | 4/2016 |
| WO | WO-2016062425 A1 * 4/2016 ............ F01K 23/10 |
| WO | WO 2016/150455 A1 | 9/2016 |
| WO | WO 2017/001710 A | 1/2017 |
| WO | WO 2017/049320 A1 | 3/2017 |
| WO | WO 2017/147022 A1 | 8/2017 |
| WO | WO 2018/011363 A1 | 1/2018 |
| WO | WO-2018024409 A1 * 2/2018 ............ F01K 3/14 |
| WO | WO 2018/101989 A1 | 6/2018 |
| WO | WO 2018/164647 A1 | 9/2018 |
| WO | WO 2019/020562 A1 | 1/2019 |
| WO | WO 2019/149623 A1 | 8/2019 |
| WO | WO 2019/224538 A1 | 11/2019 |
| WO | WO 2020/068758 A1 | 4/2020 |
| WO | WO 2020/136456 A1 | 7/2020 |
| WO | WO 2020/254001 A1 | 12/2020 |
| WO | WO 2022/086630 A1 | 4/2022 |
| WO | WO 2022/187903 A1 | 9/2022 |
| ZA | 201603514 B | 11/2018 |

OTHER PUBLICATIONS

"Matching Time Of Use Periods With Grid Conditions Maximizes Use Of Renewable Resources", California ISO, Outcropping Way, Folsom, 2015, Total pp. 2.

"Miscibility Gap Alloys", University of Newcastle, accessed at https://miscibilitygapalloy.blogspot.com/p/how-did-it-stater-ted.html on Apr. 2, 2022.

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.

Alexis McKittrick, "Low Temperature & Coproduced Resources Reservoir Thermal Energy Storage (RTES) Portfolio", Geothermal Technologies Office, U.S. Department of Energy, dated Feb. 2022. Total pp. 4.

AMETEK Process Instruments, "Reduce Nox Emissions While Improving Fuel Efficiency", EDG Series Gas Analyzers, Year: 2018, in 2 pages.

Anthony Rawson et al., "Effective conductivity of Cu—Fe and Sn—AI miscibility gap alloys", International Journal of Heat and Mass Transfer, vol. 77, Oct. 2014, pp. 395-405, Total pp. 11.

Antoni Gil et al., "State of the art on high temperature thermal energy storage for power generation. Part 1-Concepts, materials and modellization", Renewable and Sustainable Energy Reviews, vol. 14, Issue 1, Jan. 2010, pp. 31-55, Total pp. 25.

Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.

Bao Truong, "Malta Pumped Heat Energy Storage System Green Heat & Power Application", Energy Storage for Manufacturing and Industrial Decarbonization Workshop, Feb. 9, 2022, Total pp. 5.

Ben Bollinger, "Malta Pumped Heat Energy Storage", Malta, Aug. 10, 2021, Total pp. 9.

Cédric Philibert, "Renewable Energy for Industry", Renewable Energy Division, International Energy Agency, Nordic Pavillion, COP23, Fidji—Bonn, Nov. 15, 2017, Total pp. 17.

Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.

Charles Forsberg et al., "Variable Electricity from Base-load Nuclear Power Plants Using Stored Heat", International Congress on Advances in Nuclear Power Plants (ICAPP 2015), May 2015, Total pp. 12.

Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.

Charles Forsberg, "Hybrid systems to address seasonal mismatches between electricity production and demand in nuclear renewable electrical grids", Energy Policy, vol. 62, Nov. 2013, pp. 333-341, Total pp. 9.

Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.

Christopher Fraughton, "Electro-Thermal Energy Storage General Presentation", MAN Energy Solutions, Aug. 2021, Total pp. 23.

CK-12 Foundation, "Saturated Hydrocarbon", Apr. 2, 2022, Total pp. 8.

Clifford K. Ho, "High-Temperature Thermal Storage in Moving and Fixed Particle Beds", Thermal-Mechanical-Chemical Energy Storage (TMCES) Workshop, San Antonio, TX, dated Aug. 10, 2021. Total pp. 13.

Cowper Stove An overview ScienceDirect Topics, Sep. 13, 2021, Total pp. 25.

D. Fernandes et al., Thermal energy storage: "How previous findings determine current research priorities", Energy, vol. 39, Issue 1, Mar. 2012, pp. 246-257, Total pp. 12.

Daniel C Stack et al., "Performance of firebrick resistance-heated energy storage for industrial heat applications and round-trip electricity storage", Applied Energy, vol. 242, May 15, 2019, pp. 782-796, Total pp. 15.

Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.

Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.

Daniel Stack et al., "Joule Hive-Replacing fire with renewable heat", Aug. 28, 2021, Total pp. 15.

David Bierman, "Clean, affordable, and reliable heat & electricity", Antora Energy, Feb. 2022, Total pp. 9.

David L. Chandler "MIT News: Turning desalination waste into a useful resource" MIT News Office, Feb. 13, 2019 (Cited in NFOA dated Sep. 14, 2022 in related U.S. Appl. No. 17/650,522.).

David Roberts, "Solar power's greatest challenge was discovered 10 years ago. It looks like a duck", www.vox.com, Aug. 29, 2018, Total pp. 19.

Dr. Avi Shultz, "Concentrating Solar-thermal Power and Thermal Energy Storage", U.S. Department of Energy, dated Feb. 8, 2022. Total pp. 7.

Dr. Avi Shultz, "Industrial Decarbonization:Renewable Process Heating from Concentrating Solar Thermal", U.S. Department of Energy, dated Feb. 8, 2022. Total pp. 6.

Dr. Eric L. Miller, "The Hydrogen Energy Earthshot and H2@Scale: Importance to Industrial Decarbonization", Energy StorM Panel, Feb. 8, 2022, Total pp. 9.

(56) References Cited

OTHER PUBLICATIONS

Dr. Gianluca Ambrosetti et al., "Cement Production", Energy Storage for Manufacturing and Industrial Decarbonization Workshop "Energy StorM", Feb. 8, 2022, Total pp. 10.
Dr. Jeffrey Goldmeer, "Power To Gas: Hydrogen for Power Generation Fuel Flexible Gas Turbines as Enablers for a Low or Reduced Carbon Energy Ecosystem," GE Power, Feb. 2019, 19 pages.
Echogen, "CO2-Based Pumped-Thermal Energy Storage Technical Overview & Status", Echogen Power System, Total pp. 20, Aug. 10-11, 2021.
Elizabeth Endler, "Energy Storage for Manufacturing Petrochemical Industry Perspective", Feb. 8, 2022, "Energy StorM" Workshop, US Department of Energy, Total pp. 14.
Elliott Group, "Materials for Hydrogen Compression", Thermo-Mechanical-Chemical Energy Storage Workshop, Elliott, Aug. 10-11, 2021, Total pp. 25.
Emiliano Bellini, "Long-duration thermal storage system based on silica sand", pv magazine International, Nov. 5, 2021, Total pp. 6.
Emiliano Bellini, "Storing wind, solar power with silica sands", pv magazine International, Sep. 1, 2021, Total pp. 10.
Fakhroleslam, Mohammad, et al., "Thermal/catalytic cracking of hydrocarbons for the production of olefins; a state-of-the-art review III: Process modeling and simulation", Elsevier, www.elsevier.com/locate/fuel, Fuel 252 (2019) 553-566, in 14 pages.
GE Energy Storage Unit RSU-4000, Modular, Scalable Energy Storage Solution for Utility-Scale Applications; www/ge.com/energystorage; 2020, 1 page.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total pp. 67.
Haisheng Chen et al., "Progress in electrical energy storage system: A critical review", Progress in Natural Science, vol. 19, Issue 3, Mar. 10, 2009, pp. 291-312, Total pp. 22.
Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Received Dec. 14, 2019; Accepted Mar. 4, 2020; 20 pages.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Hélder Da Silva, "Energy Storage for Manufacturing and Industrial Decarbonization Workshop "Energy StorM"", Feb. 8, 2022, Total pp. 11.
Hitesh Bindra et al., "Sliding flow method for exergetically efficient packed bed thermal storage", Applied Thermal Engineering, vol. 64, Issues 1-2, Mar. 2014, pp. 201-208, Total pp. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.
"How thermal power plants can benefit from the energy transition", The Future of Energy 2019, Siemens Gamesa Renewable Energy, 10 pages.
Ilievski D, "New Two-Stage Calcination Technology", Proceedings of the 9th International Alumina Quality Workshop, Alcoa World Alumina, Technology Delivery Group, Western Australia, 2012, Total pp. 7.
Industrial Decarbonization using Electric Thermal Energy Storage (ETES), Jan. 25, 2022, Total pp. 11.
International Search Report mailed on Sep. 14, 2022 for International Application No. PCT/US2021/061041, 41 pages.
International Search Report and Written Opinion mailed on Mar. 1, 2024 for International Application No. PCT/US2023/034488, 14 pages.
International Search Report and Written Opinion mailed on May 17, 2024 for International Application No. PCT/US2023/085826, 14 pages.
International Search Report and Written Opinion mailed on Aug. 23, 2024 for International Application No. PCT/US2024/024158, 9 pages.
International Search Report and Written Opinion mailed on Dec. 20, 2024 for International Application No. PCT/US2024/024156, 29 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Jeff Moore, "Oxygen Storage Incorporated into the Allam OxyFuel Power Cycle", Southwest Research Institute, Total pp. 8, Aug. 10-11, 2021.
Ji, Huichao, et al., "Electricity Consumption Prediction of Solid Electric Thermal Storage with a Cyber-Physical Approach", Energies 2019, 12, 47441 doi: 10.3390/en12244744, www.mdpi.com/journal/energies, published on Dec. 12, 2019, in 18 pages.
Joe Cresko, "Energy Storage for Manufacturing", Energy Storage for Manufacturing & Industrial Decarbonization Workshop, Feb. 8-9, 2022, Total pp. 11.
Joe Paladino, "Transformation of the Electric Grid", Energy StorM Workshop, Feb. 4, 2022, Total pp. 5.
Joe Stekli, "LCRI Update TMCES 2021", Low-Carbon Resources Initiative, Electric Power Research Institute, Aug. 2021, Total pp. 31.
Joshua Schmitt, "Development of An Advanced Hydrogen Energy Storage System Using Aerogel In A Cryogenic Flux Capacitor (Cfc)", Southwest Research Institute, Aug. 10, 2021, Total pp. 8.
Lion Hirth, "The market value of variable renewables: The effect of solar wind power variability on their relative price", Energy Economics, vol. 38, Jul. 2013, pp. 218-236, Total pp. 19.
Lion Hirth, "The Optimal Share of Variable Renewables: How the Variability of Wind and Solar Power affects their Welfare-optimal Deployment", The Energy Journal, vol. 36, No. 1, p. 149-184, (2015). Total pp. 36.
Lori Schaefer-Weaton, "Solar & Battery Energy Solution Agri-Industrial Plastics Co.", Agri-Industrial Plastics Company, Feb. 2022, Total pp. 12.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2014, Total pp. 7.
Marc Medrano et al., "State of the art on high-temperature thermal energy storage for power generation. Part 2-Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.
Mecys Palsauskas, et al.: "Device ensuring effective usage of photovoltaics for water heating", Electrical Engineering, 101 (1), 189-202, Apr. 8, 2019 (Apr. 8, 2019), DOI: 10.1007/s00202-019-00766-0.
Michael Pesin, "The Office of Electricity Grid Modernization R&D Portfolio", Aug. 2, 2021, Total pp. 18.
Mike Gravely, "The Role of Energy Storage in Helping California Meet the State's Future Zero Carbon Energy Goals", Energy Research and Development Division, California, 2021, Total pp. 23.
Natalie Smith et al., "Integration of Pumped Heat Energy Storage with a Fossil-Fired Power Plant", U.S. Department of Energy, 2021, Total pp. 6.
PCT; Invitation to Pay Additional Fees issued in International Patent Application No. PCT/US2021/061041; mailed Mar. 24, 2022; 21 Pages.

(56) References Cited

OTHER PUBLICATIONS

Pintail Power LLC, "Liquid Air Combined Cycle Hybrid Energy Storage", Pintail Power LLC, TMCES Workshop, Aug. 10-11, 2021, San Antonio, TX, Total pp. 12.
Office Action in U.S. Appl. No. 17/650,519 mailed Apr. 20, 2022, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Reply to Communication Under Rule 71(3) EPC, received in corresponding EP App. No. 21 843 808.3, submitted May 6, 2024, in 9 pages.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.
Russ Weed, "Market Needs & Technology Overview", Thermal-Mechanical-Chemical Energy Storage Workshop—Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sakakibara, Reyu, et al., "Practical emitters for thermophotovoltaics: a review", Journal of Photonics for Energy, vol. 9, Issue 3, 032713 (Feb. 2019), https://doi.org/10.1117/1.JPE.9.032713, in 38 pages.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Scott Hume, "Mid-Duration Energy Storage (MDES) Benefits and Challenges", 3rd TMCES Workshop, Aug. 10, 2021, Total pp. 11.
Sempra Energy Utility, "SoCalGas", Total pp. 6, Oct. 2021.
Sharadga, Hussein, et al., "A hybrid PV/T and Kalina cycle for power generation", Int J Energy Res. 2018;42:4817-4829, https://doi.org/10.1002/er.4237, dated Sep. 7, 2018.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens AG, "Compressed Air Energy Storage (CAES)", 3rd Thermal-Mechanical-Chemical Energy Storage Workshop, Siemens Energy, Aug. 2021, Total pp. 17.
Siemens Gamesa, "Electric Thermal Energy Storage (ETES)—Industrial Decarbonization", Siemens Gamesa Renewable Energy, 2020, Total pp. 9.
Song, Jian, et al., "Combined supercritical CO2 (SCO2) cycle and organic Rankine cycle (ORC) system for hybrid solar and geothermal power generation: Thermoeconomic assessment of various configurations", (Year: 2021), in 16 pages.
Soteris Kalogirou, "The potential of solar industrial process heat applications", Applied Energy, vol. 76, Issue 4, Dec. 2003, pp. 337-361, Total pp. 25.
Steffes, ThermElect Hydronic, Demand-Free, Off-Peak Heating, May 2020, Total pp. 2.
Stefica Nicol Bikes, "Australian engineers patent thermal block to store renewable energy", www.reuters.com, Oct. 26, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require A High Steam Quality", Steam Systems Best Practices, Document No. 23, 2009, Total pp. 3.
T. Fiedler et al., "Thermal capacitors made from Miscibility Gap Alloys (MGAs)", WIT Transactions on Ecology and The Environment, vol. 186, 2014, Total pp. 8.
Third Party Objections raised in corresponding EP App. No. 21 843 808.3, dated Apr. 30, 2024, with English Translation, in 8 pages.
Thomas A. Buscheck, "Hybrid-energy technology enabled by heat storage and oxy- combustion for power and industrial-heat applications with near-zero or negative CO2 emissions", Thermal-Mechanical-Chemical Energy Storage Workshop, San Antonio, Texas, Aug. 10, 2021, Total pp. 22.
Timothy C. Allison, "Thermal-Mechanical-Chemical Energy Storage Technology Overview and Research Activities", Southwest Research Institute, Aug. 9, 2021, Total pp. 22.
Todd Brix, "Converting Carbon. Storing Energy", Richland, Washington U.S.A., Feb. 9, 2022, Total pp. 13.
Tony Bowdery et al., "Heat Exchangers For Thermal Energy Storage: Challenges And Mitigation", Meggitt, Aug. 2021, Total pp. 20.
Torbjörn Lindquist, "Powering the evolution of a renewable society, by redefining energy infrastructure", Azelio, Feb. 7, 2022, Total pp. 10.
Travis McLing et al., " Dynamic Earth Energy Storage: Grid Scale Energy Storage using Planet Earth as a Thermal Battery (RTES)", Feb. 2022, Total pp. 7.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Vishal Sardeshpande, "Performance analysis for glass furnace regenerator", Applied Energy, vol. 88, Issue 12, Dec. 2011, pp. 4451-4458, Total pp. 8.
Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority mailed on Sep. 14, 2022 for PCT/US2021/061041, 26 pages.
Zhao, Haichuan, et al., "Thermal Calculation and Experimental Investigation of Electric Heating and Solid Thermal Storage System", Energies 2020, 13, 5241; doi: 10.3390/en13205241, www.mdpi.com/journal/energies, published on Oct. 9, 2020, in 20 pages.
Zhou et al., "Highly Conductive Porous Graphene/Ceramic Composites for Heat Transfer and Thermal Energy Storage," Adv. Funct. Mater., 2013, 23, pp. 2263-2269.
International Search Report and Written Opinion mailed on Apr. 25, 2025 for International Application No. PCT/US2024/051145, 19 pages.

\* cited by examiner

THERMAL ENERGY STORAGE SYSTEM FOR SIMPLE AND COMBINED CYCLE POWER GENERATION

CROSS-REFERENCE TO RELATED APPLICATIONS

This application claims priority to the following:
U.S. Provisional Patent Application No. 63/638,363 filed on Apr. 24, 2024;
The following patent applications and patent are directed to related technologies:
U.S. Provisional Patent Application No. 63/459,540 filed on Apr. 14, 2023;
U.S. Provisional Patent Application No. 63/578,139 filed on Aug. 22, 2023;
U.S. Provisional Patent Application No. 63/626,501 filed on Jan. 29, 2024;
U.S. patent application Ser. No. 18/395,266 filed on Dec. 22, 2023;
U.S. patent application Ser. No. 17/537,407 (filed Nov. 29, 2021; issued as U.S. Pat. No. 11,603,776 on Mar. 14, 2023); and
International Patent Application No.: PCT/US2021/061041 (filed Nov. 29, 2021).
All of the foregoing applications are incorporated herein by reference in their entirety for all purposes.

BACKGROUND

Technical Field

The present disclosure relates to thermal energy storage and utilization systems. M ore particularly, the present disclosure relates to an energy storage system that stores electrical energy in the form of thermal energy, which can be used for the supply of hot air, nitrogen, argon, carbon dioxide ($CO_2$), steam, process gas, inert gas, hydrogen, or other heated fluids, for various applications including the supply of heat for power generation. M ore specifically, the present disclosure relates to using thermal energy storage systems to improve efficiency and reduce carbon emissions associated with simple cycle and combined cycle power plants.

Related Art

I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy, different heating processes or industrial processes, require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge.

Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into a storage medium, and then transferred at another time from the storage medium to an outlet. The rate of heat transfer into and out of the storage medium is limited by factors including the heat conductivity and capacity of the medium, the surface area across which heat is transferring, and the temperature difference across that surface area. High rates of charging are enabled by high temperature differences between the heat source and the storage medium, high surface areas, and the use of a storage medium with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. M ore specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the blocks closest to the heating wire are heated more than the blocks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a desire to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Storage of Intermittent Energy

Fossil fuels have driven the world economy since the industrial revolution; however, mankind has discovered that not only is there a limited supply of these energy resources, but also that the combustion of fossil fuels to extract their energy produces greenhouse gases and other pollutants that threaten planet-wide ecosystems. Specifically, such systems are inherently inefficient in their use of the energy locked up in chemical bonds because they emit innumerable tons of hot combustion gases out smokestacks into our atmosphere, directly causing global warming, indirectly causing global warming through the effects of greenhouse gas emissions on the increased absorption of sunlight by planet Earth, as well as the effects of the pollutants' contribution to the degradation of our planet through, for example, the washing of the Earth's various ecosystems in acid rain.

Energy sources that address this problem, such as solar energy, wind energy, and tidal energy are being developed to meet our need for renewable energy sources that do not generate these harmful greenhouse gases. One drawback that renewable energy sources have is that they are of an intermittent nature. The sun does not always shine; the wind does not always blow; tides are not always flowing. This has prevented these technologies from becoming replacements for fossil fueled energy sources, since industry requires power on demand, 24 hours a day, 365 days a year.

Therefore, what is needed is a way to store the intermittent energy that renewable energy sources provide in a closed loop to meet the constant power demands of industry without expelling heat and pollutants to the atmosphere. This has led to the development of green energy storage solutions, as well as the systems and methods for heat storage and extraction from structured solid blocks in thermal energy storage units as described herein.

One hurdle that lies between the conception and initial development of thermal storage solutions and their actual implementation is the interfacing of such solutions with existing industrial equipment to make use of existing assets and infrastructure. Consequently, what is needed are systems for the modularization of such thermal energy storage units that may be combined in various fashions to provide for customized solutions that meet the individual needs for retrofitting such fossil fuel fired power systems. Furthermore, there is a great need to enable the evaluation of thermal energy storage units as a green energy alternative to existing fuel fired boiler systems without redesigning and rebuilding existing industrial infrastructure. Along these lines, what is desperately needed are systems that allow for easily switching between fossil fuel energy sources and variable renewable electricity sources to evaluate the latter as replacements for existing fossil fuel fired energy sources. This would greatly help achieve the worldwide goals set forth in the Paris Climate Accord, in particular a 45% reduction in greenhouse gas emissions by 2030, with a net zero emission goal target set for 2050. In particular, systems and methods for the coupling of one or more thermal energy storage units to fuel fired boiler systems is needed, along with control systems that coordinate the operation of systems containing multiple thermal energy storage units. This coupling of two completely different energy sources allows for reversibly evaluating this new sustainable technology for the possible retrofitting or replacement of the fossil fuel based systems with a green energy supply, while retaining much of the capital equipment that is already paid for and in service.

III. Seismic Stability of Stored Thermal Energy Systems

Thermal energy storage (TES) systems can be deployed to solve energy storage issues at various locations around the world, including those in seismically active regions. Because thermal storage mediums can sometimes be in the form of heavy blocks of refractory materials, designing the TES system with features to secure those blocks and withstand seismic events will allow for greater availability of the TES system throughout the world.

SUMMARY

The example implementations advance the art of thermal energy storage and enable the practical construction and operation of high-temperature thermal energy storage (TES) systems that can charge by VRE, store energy in storage media, and deliver high-temperature heat. This Section of the Summary relates to the disclosure as it appears in U.S. patent application Ser. No. 17/668,333 (U.S. Pat. No. 11,603,776).

Aspects of the example implementations relate to a system for thermal energy storage, including an input (e.g., electricity from a variable renewable electricity (VRE) source), a container having sides, a roof and a lower platform, a plurality of vertically oriented thermal storage units (TSUs), inside the container, the TSUs each including a plurality of stacks of blocks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen, nitrogen, argon, other inert gases, and other gases, alone or in combination), and when one is mentioned, it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g., to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

Optionally, some implementations may use the TES to keep the steam turbine at a defined temperature above ambient temperature but without spinning the steam turbine. Optionally, the TES system may provide energy to keep both the steam turbine (in a spinning or non-spinning state) and at least portions of the HRSG warm at or above the defined temperature or temperature range. Optionally, the TES system maintains only portions of the HRSG warm at or above the defined temperature or temperature range. Optionally, the TES system maintains only portions of the steam turbine warm at or above the defined temperature or temperature range, such as but not limited to the turbine housing, turbine shaft, turbine seals, and/or turbine shell.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
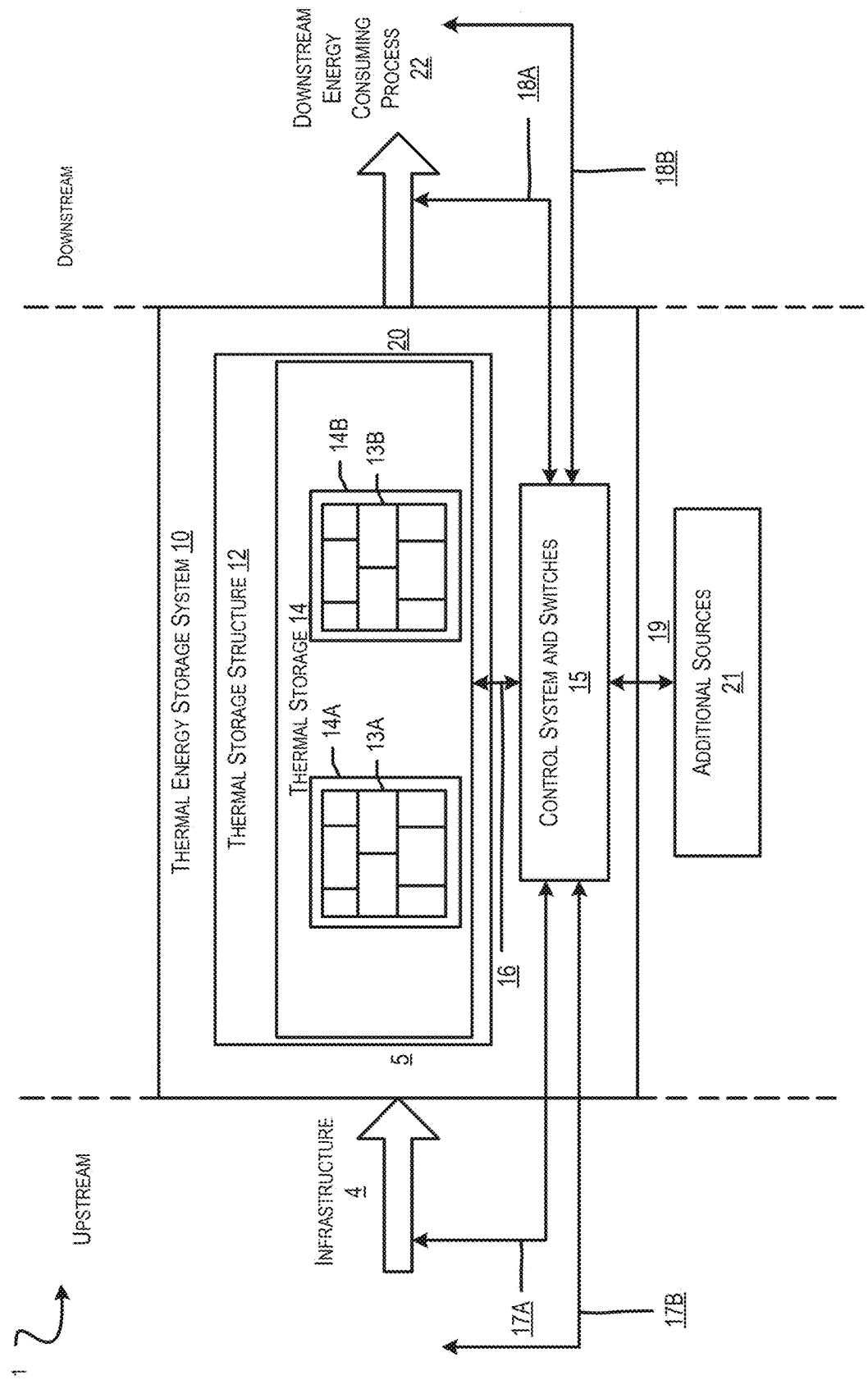
FIG. 1 illustrates a schematic diagram of the thermal energy storage system architecture according to the example implementations.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of a solid storage medium (e.g., 7B, 13A) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage medium within the assemblages may variously be referred to as thermal storage blocks, blocks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter portions of the solid storage medium, and absorbed and stored in the solid storage medium within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various implementations.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19.

Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2 and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently store energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
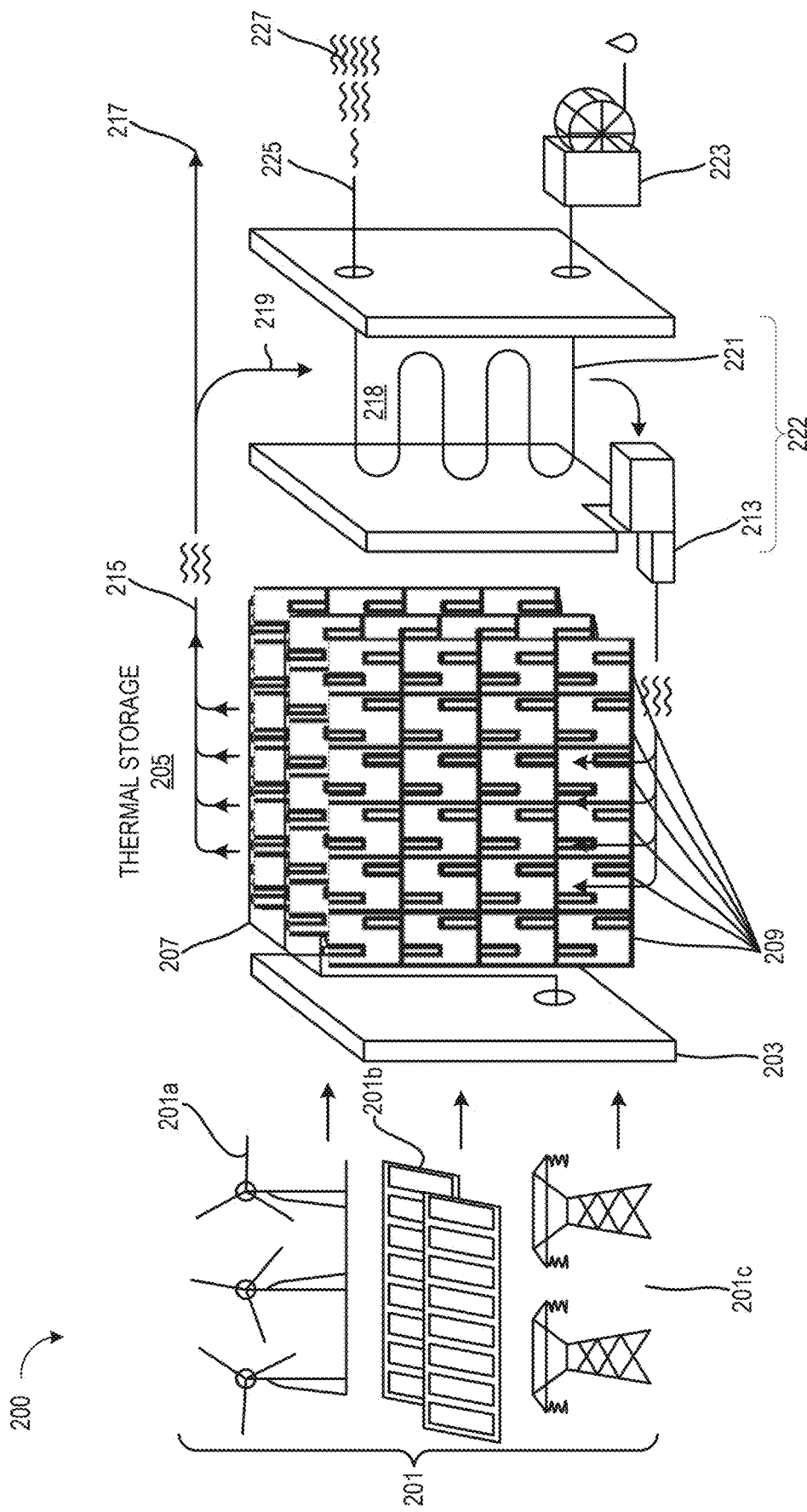
FIG. 2 illustrates a schematic diagram of a system according to the example implementations.

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201a, solar energy from photovoltaic cells 201b, or other energy sources may provide electricity that is variable in availability or price because the conditions for generating the electricity are varied. For example, in the case of wind turbine 201a, the strength, duration and variance of the wind, as well as other weather conditions causes the amount of energy that is produced to vary over time. Similarly, the amount of energy generated by photovoltaic cells 201b also varies over time, depending on factors such as time of day, length of day due to the time of year, level of cloud cover due to weather conditions, temperature, other ambient conditions, etc. Further, the input electricity may be received from the existing power grid 201c, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage medium 209. Thermal storage components (sometimes called "blocks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented—one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by blocks in each of the arrays 209, with flow controlled by louvers. By the release of heat energy from the resistive heating elements 207, heat is radiatively transferred to arrays 209 of blocks during a charging mode. Relatively hotter block surfaces reradiate absorbed energy (which may be referred to as a radiative "echo") and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
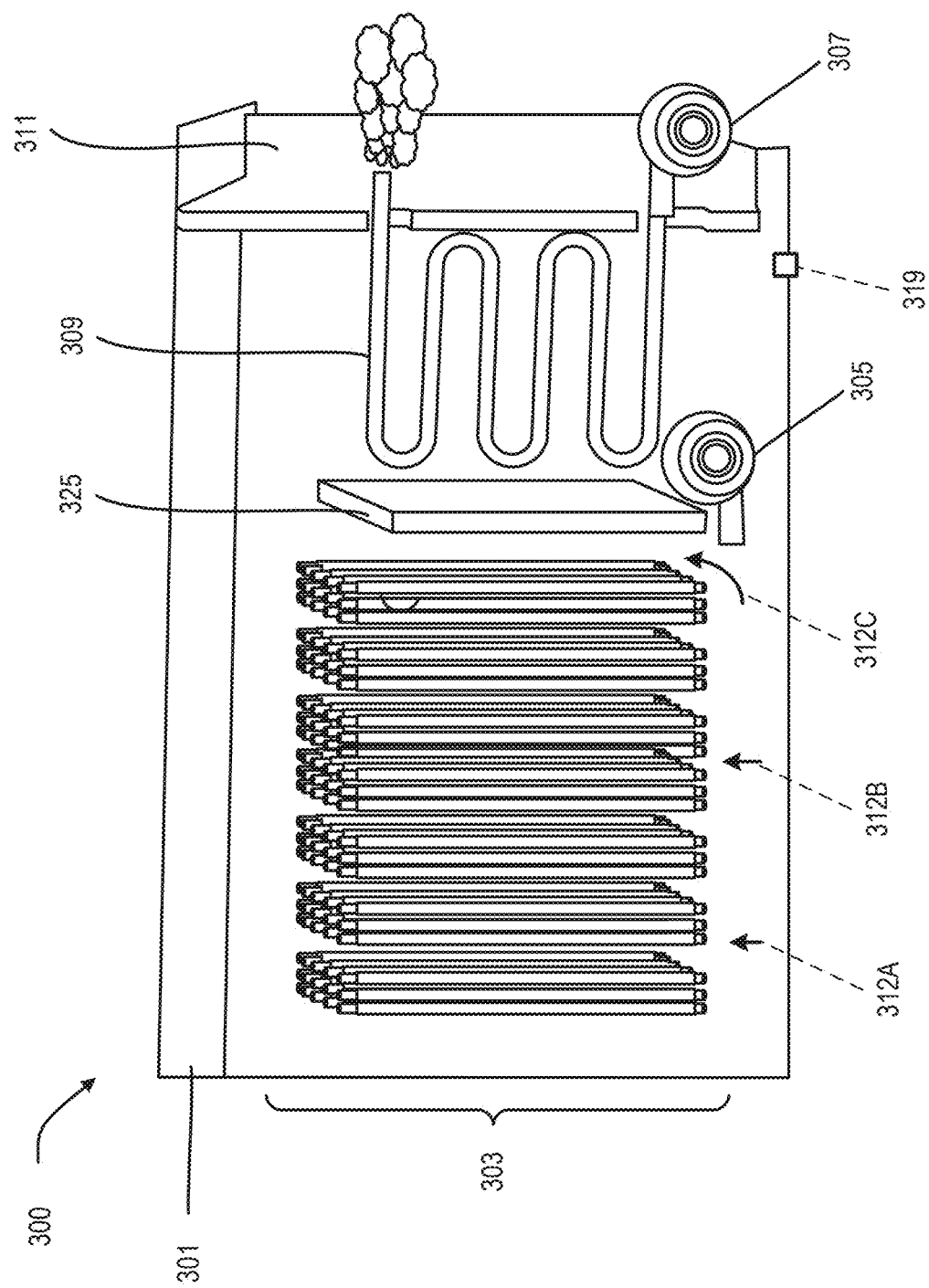
FIG. 3 illustrates a schematic diagram of a storage-fired once-through steam generator (OTSG) according to the example implementations.

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319 and include a first fluid flow 312A (which may be directed to a first stack within thermal storage 303) and a second fluid flow 312B (which may be directed to a second stack within thermal storage 303).

A s the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water, or another fluid pumped by the water pump 307. As the hot air heats up the water in the conduit, steam is generated at 311. The cooled air that has crossed the conduit (and transferred heat to the water flowing through it) is then fed back into the block heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSG s are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design challenging to implement. In many implementations, the steam quality is not 100% unless very special steam separators are installed in the drum. There is <1% frequently <0.1% water mist entrained in the steam. As is stated, the superheating further assures the high steam quality. The function of the superheater is to evaporate any mist and to heat the vapor above the evaporation temperature, the saturated steam temperature, which is the dew point at that pressure. The dew point is the temperature and pressure that as the steam cools, even slightly, a portion of the steam, (water vapor), condenses into liquid water.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
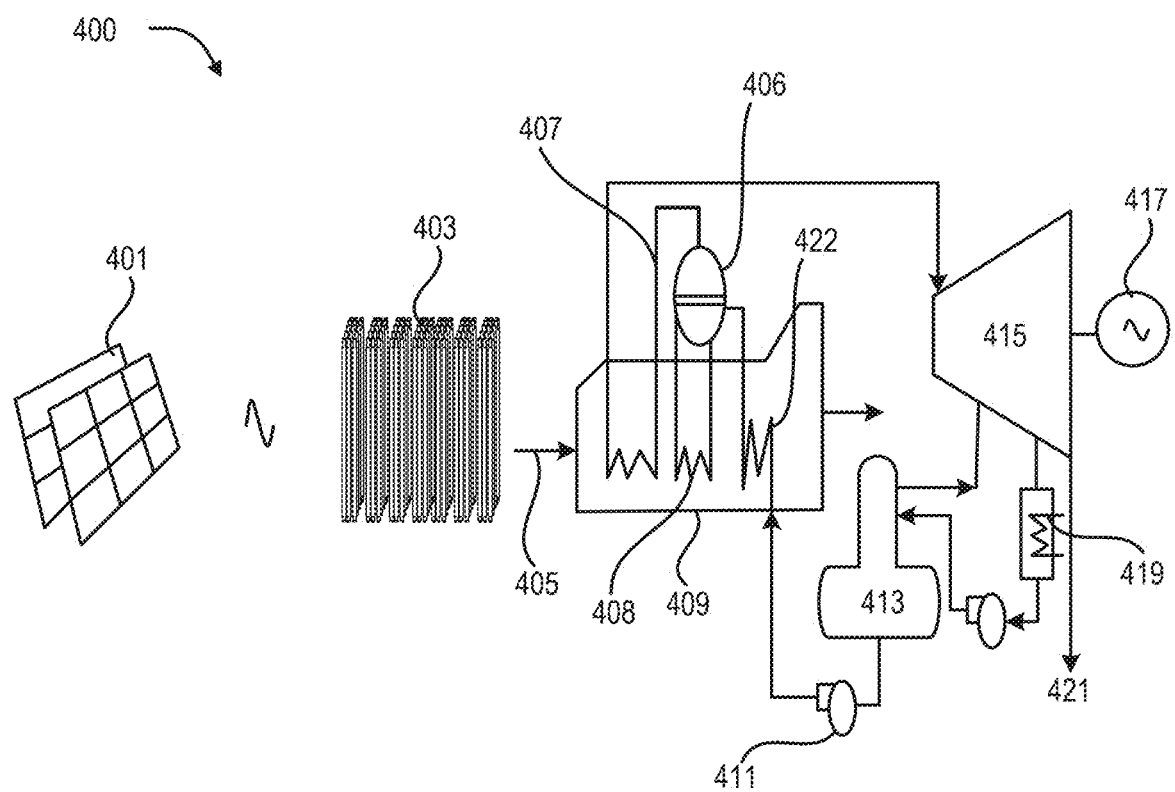
FIG. 4 illustrates an example view of a system being used as an integrated cogeneration system according to the example implementations.

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 4, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation. In many implementations, when superheated steam is used at least partially for mechanical power, the pressure is reduced through a turbine. This reduces the temperature even more than the pressure, and the temperature passes through the dew point and some of the steam condenses in the turbine. The water is detrimental to the turbine. Therefore, for co-generation or power projects, it may be desirable to add more heat to the steam to elevate the temperature to allow the temperature to drop and still be above the dew point for extraction of mechanical power without condensing water. For heating, as in distillation, the steam is saturated, as the condensation at high temperature delivers the most heat at the highest temperature.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner. The steam may drive a low-pressure letdown steam turbine to turn the pump and the exhaust steam may still have 90% of the energy for another use of the lower quality steam. It replaces the electric motor. Optionally, some implementations may use an inverse temperature cascade. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
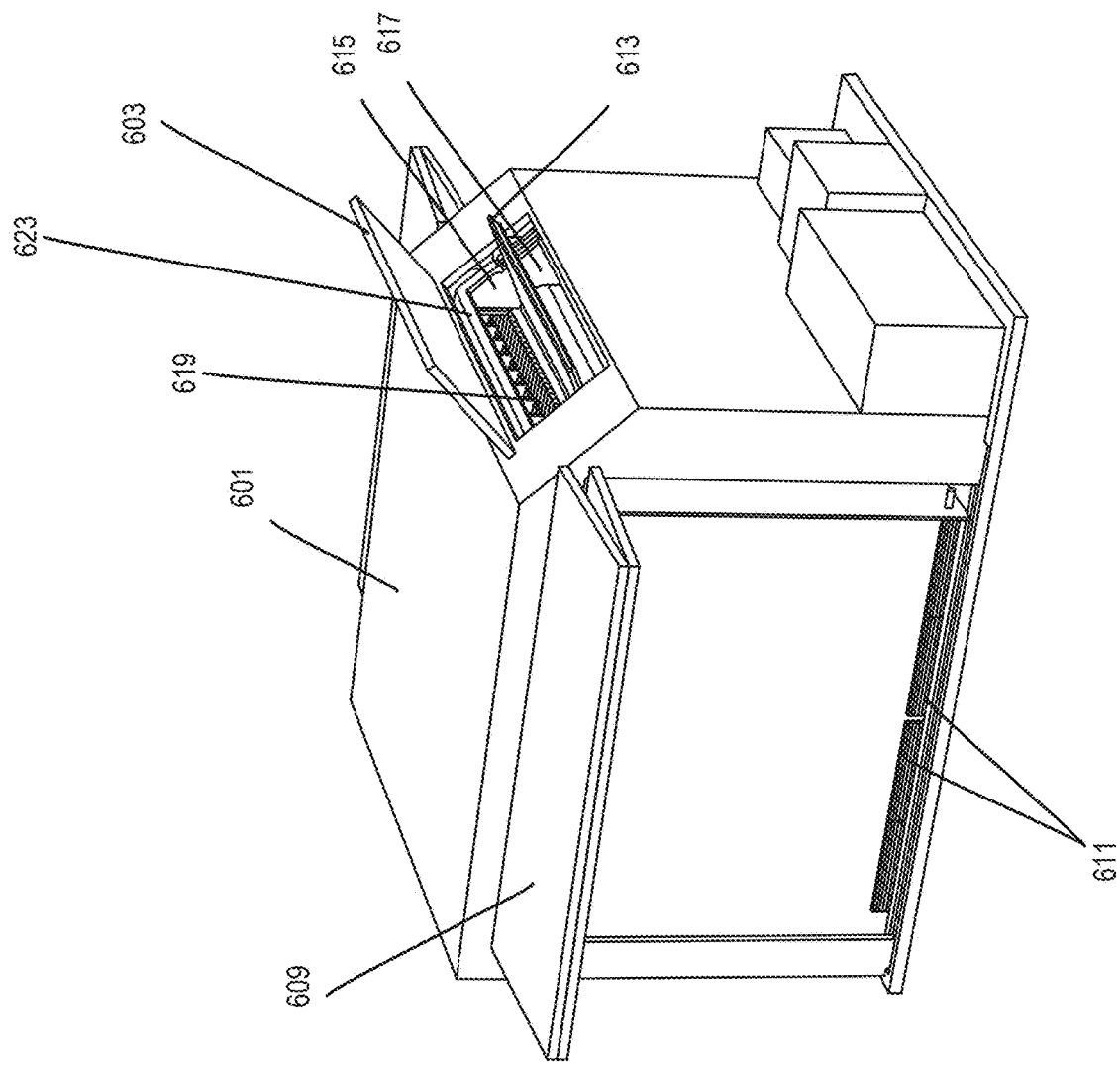
FIG. 6 provides an isometric view of the thermal storage unit with multiple vents closures open, according to some implementations.

In an OTSG implementation, a first end of the conduit can be fluidically coupled to a water source. The system may provide for inflow of the fluids from the water source into a first end of the conduit and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional super-heater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. M ore details of these industrial applications are provided below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 5:
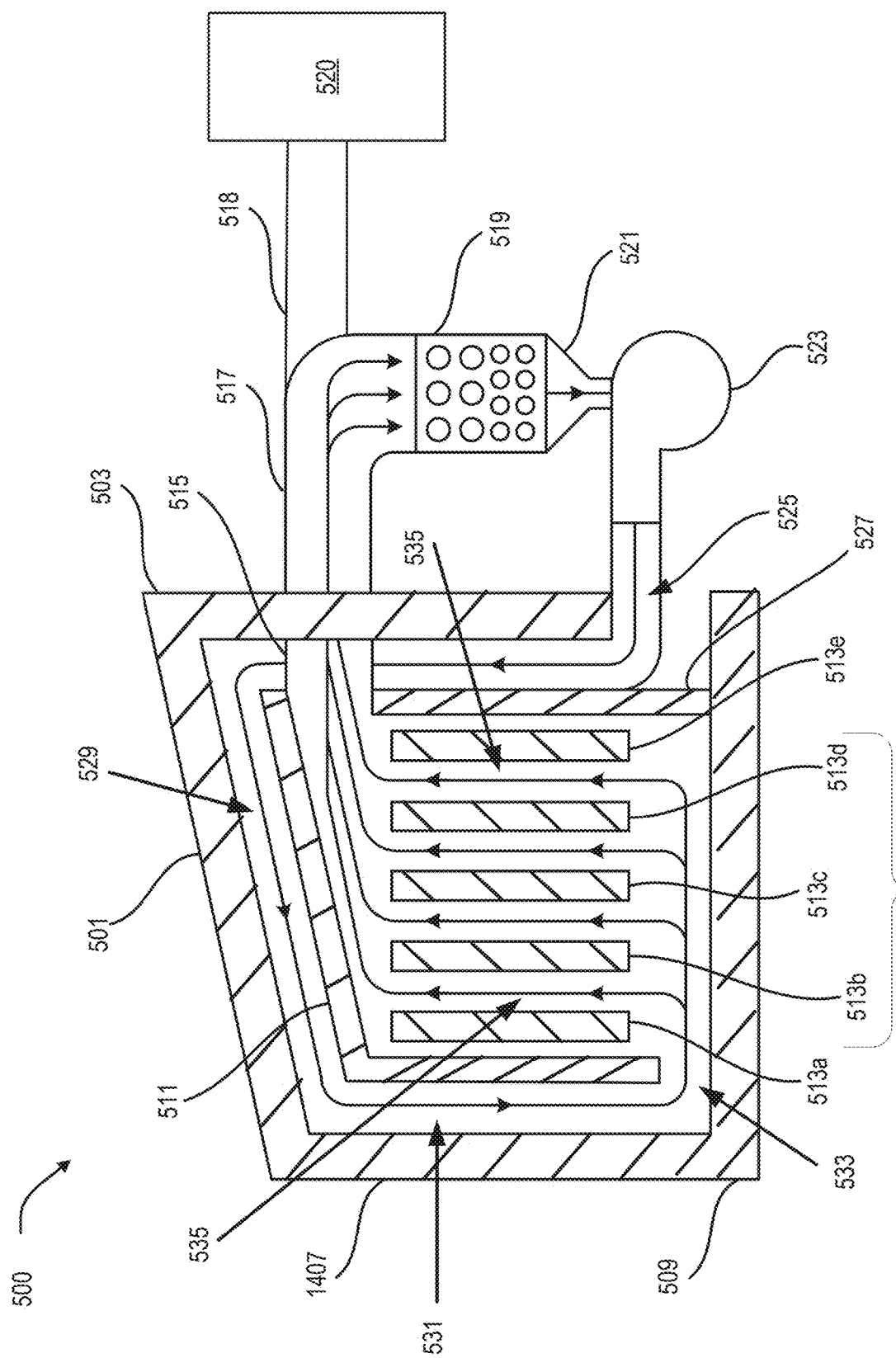
FIG. 5 illustrates dynamic insulation according to the example implementations.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of blocks in stack 513, the columns being represented as 513a, 513b, 513c, 513d and 513e. The heated fluid that is discharged from the upper portion of the columns of blocks 513a, 513b, 513c, 513d and 513e exits by way of an output 515, which is connected to a duct 517. Duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. A n air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of blocks 513a, 513b, 513c, 513d and 513e and the air passages 535 are show n schematically in FIG. 5. The physical structure of the stacks and airflow passages therethrough in implementations described herein is more complex, leading to advantages.

In some implementations, to reduce or minimize the total energy loss, the layer of insulation 511 is a high-temperature primary insulation that surrounds the columns 513a, 513b, 513c, 513d and 513e within the housing. Outer layers of lower-cost insulation may also be provided. The primary insulation may be made of thermally insulating materials selected from any combination of refractory blocks, alumina fiber, ceramic fiber, and fiberglass or any other material that might be apparent to a person of ordinary skill in the art. The amount of insulation required to achieve low losses may be large, given the high temperature differences between the storage medium and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the blocks 513a, 513b, 513c, 513d and 513e within the housing so that the blocks 513a, 513b, 513c, 513d and 513e are not in contact with the outer surface 501, 503, 507 of the housing, and are thus thermally isolated from the housing by the primary insulation formed by the layer of cool fluid. The blocks 513a, 513b, 513c, 513d and 513e may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the blocks, which restricts the dissipation of thermal energy being generated by the heating elements and/or stored by the blocks into the outside environment or the housing, and preheats the fluid. As a result, the controlled flow of cold fluid by the fluid blowing units of the system may facilitate controlled transfer of thermal energy from the blocks to the conduit, and also facilitates dynamic thermal insulation, thereby making the system efficient and economical.

In another example implementation, the buoyancy of fluid can enable an unassisted flow of the cold fluid around the blocks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat desired to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in implementations for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Blocks and Heating Elements
A. Problems Solved by One or More Disclosed Implementations Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the blocks.

B. Example Solutions Disclosed Herein

In some implementations, thermal storage blocks (e.g., blocks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers but are not directly open to the heating element. The stack of blocks may be used alone or in combination with other stacks of blocks to form the thermal storage unit, and one or more thermal storage units may be used together in the thermal energy storage system. As the fluid blower circulates the fluid through the structure during charge and discharge as explained above, a thermocline may be formed in a substantially vertical direction; that is, the temperature differences are relatively small or minimal between regions of fluid in a substantially vertically oriented plane or virtual "slice" through the storage medium. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid medium system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats block material with high heater power loading, low and uniform exposed surface temperature, and long-distance heat transfer within the storage medium array via multi-step thermal radiation.

Innovative structures according to the present disclosure may include an array of blocks that form chambers. The blocks have structured air passages, such that in the vertical direction air flows upwards in a succession of open chambers and small air passages. In some implementations, the array of blocks with internal air passages is organized in a structure such that the outer surface of each block within the TSU core forms a wall of a chamber in which it is exposed to radiation from other block surfaces, as well as radiation originating from an electrical heater.

The chamber structure is created by alternating block materials into a checkerboard-type pattern, in which each block is surrounded on all sides by open chambers, and each open chamber has adjacent blocks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each block within such a checkerboard structure is exposed to open chambers on all sides. Accordingly, during charging, radiant energy from multiple heating elements heats all outer surfaces of each block, contributing to the rapid and even heating of the block, and reducing reliance on conductive heat transfer within the block by limiting the internal dimensions of the block.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed block surfaces are larger per unit of mass than in prior systems, meaning that incoming wattage per unit area is correspondingly smaller, and consequently thermal stresses due to block internal temperature differences are lower. And critically, re-radiation of energy—radiation by hotter block surfaces that is absorbed by cooler block surfaces—reduces by orders of magnitude the variations in surface temperature, and consequently reduces thermal stresses in block materials exposed to radiant heat. Thus, the radiation chamber design effectively enables heat to be delivered relatively uniformly to a large horizontally oriented surface area and enables high wattage per unit area of heater with relatively low wattage per unit area of block.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in block heat conductivity, or any cracks forming in a block that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media and localized peak heater temperatures are reduced by a large factor compared to previous designs.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the blocks from the bottom end of the cells to the upper end of the cells in the first section at the predefined flow rate, and then into the second section, such that the air passing through the blocks and/or heating elements of the cells at the predefined flow rate may be heated to a second predefined temperature, and may absorb and transfer the thermal energy emitted by the heating elements and/or stored by the blocks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of inner enclosure 623 and the inner surface of the outer enclosure define a fluid passageway through which fluid may be conducted actively for dynamic cooling or passively for failsafe operation.

Inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may include an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KW H of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., block) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the blocks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Implementations implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. A n OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an implementation. Air temperature can be adjusted by recirculation/mixing, to provide inlet air temperature that does not vary with the state of charge of the blocks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various implementations releases low-pressure steam that is condensed to a liquid by a condenser 419, and then de-aerated using a deaerator 413, and again delivered to the HRSG 409.

III. Configurations for Simple and Combined Cycle Systems

Figure 7:
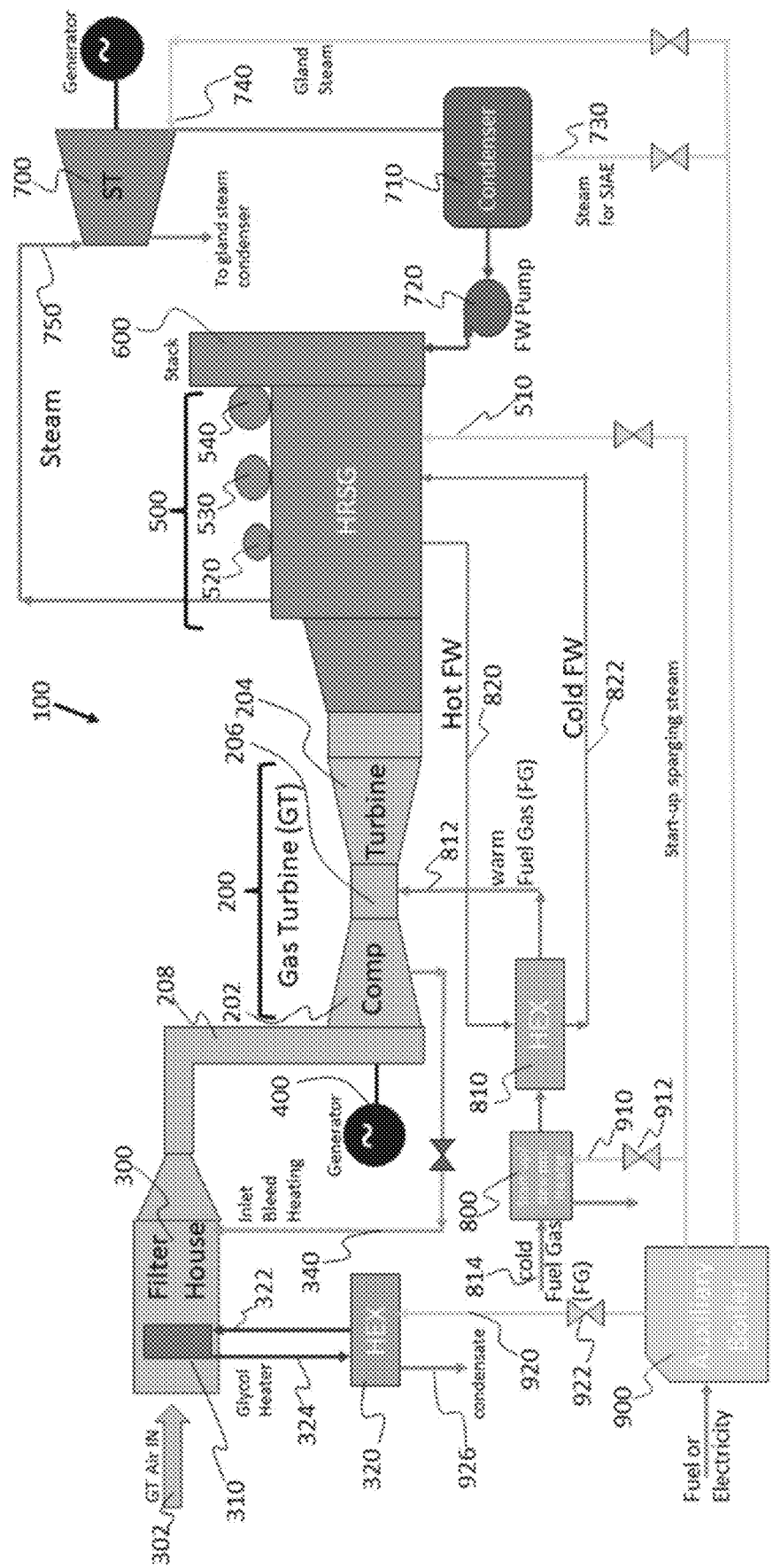
FIG. 7 illustrates an example view of a combined cycle system without a TES system.

FIG. 7 shows a combined cycle power plant as in current systems, using a gas turbine (GT) 200 with a compressor 202 and the turbine itself 204. There is a combustion chamber filter house 300, generator 400 and heat recovery steam generator (HRSG) 500, which develops steam out of the exhaust gases from the gas turbine 200. A stack 600 is coupled to the HRSG 500 in a conventional fashion. Steam coming out of the steam turbine 700 goes to a condenser 710, then to a feed water (FW) pump 720 and then fed back to HRSG 500. Steam output 740 from the HRSG 500 is shown being directed to the steam turbine 700. For ease of illustration, triple pressure steam cycle with reheat is shown in simplified way with single stream.

Air from ambient is drawn in at "GT Air IN" through the filter house 300. The filter house 300 has filters in the filter house which clean the air and then the filtered air is provided to the compressor 202 of the gas turbine 200, which compresses the filtered air. Then the fuel gas (FG) input into the GT 200 is burned with the input air 208 and expanded in the combustion chamber 206, and then as it expands through the turbine it makes the turbine 204 run, which in turn runs the compressor 202 and also drives the generator 400, which outputs power.

If the ambient conditions are not cold, then the preheating in the filter house 300 may be optional.

Hot air at the exhaust of the turbine 204 is passed through the HRSG 500, which includes a boiler (not shown) which generates a working fluid such as but not limited to steam. The gases from the HRSG 500, now at somewhat reduced temperatures, are exhausted to the atmosphere through the stack 600. This is an open cycle.

The GT 200 and the steam turbine (ST) 700 both produce power. A heat exchanger 810 warms the fuel gas 812, increases the efficiency of the gas turbine 200. The cold fuel gas 814 comes in at ambient temperature, but you can heat it up using the feed water hot feed (Hot FW) 820 from the HRSG, in a shell- and tube-type heat exchanger, then the relatively cooler feedwater (Cold FW) 822 is provided back to the HRSG.

So as the HRSG Hot FW 820 provides heat to the cold fuel gas 814 via the heat exchanger 810, the fuel gas becomes warmer (warm F G 812), which improves the efficiency of the gas turbine cycle of the GT 200, because the fuel gas has to heat up less in the turbine than if it were provided at ambient temperature.

In this non-limiting example, a start-up (dew point) heater 800 is provided and is used to heat the fuel gas above its dew point, particularly applicable in cold ambient conditions. It is used to ensure that there are no water droplets in the gas, which heated up such that everything is in a gaseous state. Optionally, the start-up and/or dew point heater 800 may employ other heat inputs such as but not limited to grid electric heaters.

During startup the heat exchanger 810 would not be on because the HRSG 500 would be cold, so the feed water 820 (normally hot during operation of the HRSG) would be cold, and would not warm the fuel gas in the heat exchanger 810.

During startup, auxiliary steam 910 can be provided from the auxiliary boiler 900 into the heat exchanger 800 (via the valve 912), which heats the incoming cold FG 814. This operation is useful particularly for cold startup; when the whole system comes to a steady state, then the valve 912 for the auxiliary steam 910 can be closed, and the system continues to run using the heat exchanger 810 suppled with hot FW 820 from the HRSG 500.

When the system is started in cold ambient conditions, the intake air (GT Air IN 302) can be preheated before being provide to the GT 200, such as by providing a glycol heater 310. The glycol heater 310 may take the form of tubes carrying glycol (which has a very low freezing point), positioned within a plenum or duct of the filter house 300.

In this non-limiting example, glycol (or other suitable heat transfer fluid) is heated in heat exchanger 320 using steam 920 from the auxiliary boiler 900, with the flow of the steam 920 being controlled by valve 922. If auxiliary boiler 900 is electrically fired, it is assumed to be based on grid power running on demand. After heating the glycol, the steam is exhausted as cooled steam in return line 926, which may be provided to a condenser (not shown) and fed back to the auxiliary boiler 900. In some implementations, condensate from Aux Steam heat Exchangers may be routed to condenser and fed back as feedwater to Aux Boiler.

Warm glycol 322 is provided into the glycol heater 310, has its heat drawn off by GT Air IN 302, and then is output as cooled glycol 324 back to the heat exchanger 320, to be heated again and provided again as warm glycol 322, in a loop.

This intake air heating is particularly useful at system startup. Inlet bleed heating 340 may also be provided in a conventional fashion, taking an extraction of compressed air from the compressor. The inlet bleed air is at a higher temperature and pressure, because it is getting compressed. It is sent out as a stream into the filter house 300.

This bleed loop is generally employed to prevent the compressor 200 from surging. The compressor 200 might not function properly at very cold ambient temperatures, when air density is higher so that mass flow rates increase.

Inlet bleed heating may also used for emission control purposes.

The heat exchanger 320 can be used for startup, and then the system can switch off the glycol loop and use the inlet bleed heating loop. However, in very low ambient temperatures, both the glycol loop and the inlet bleed heating loop may be used at the same time.

The HRSG may be preheated using start-up sparging steam 510, which is provided into an evaporator header (not separately shown) of the HRSG 500 and/or into steam drums 520 (high-pressure/HP steam drum), 530 (intermediate-pressure/IP steam drum) and/or 540 (low-pressure/L P steam drum) of the HRSG.

If the system has been nonoperative for a long period, so such that it is essentially entirely at ambient temperature, then a cold start performed.

If hot steam is provided into the evaporator, it heats up the steam drums; it heats up the headers. It can flash over the liquid level of the steam drum and also goes into the superheater (not separately shown), and starts slightly heating and pressurizing the superheater portion.

The purpose of the input steam is to preheat the HRSG 500, and it will come up to speed more quickly, for a faster start. Once the HRSG 500 is online, and the steam turbine 700 is running, then you don't need the sparging steam, which is then shut off and the HRSG is running on its own.

A steam jet air ejector (SJAE) may be used to generate a vacuum in condenser 710. Alternatively, vacuum for the condenser 710 may be generated using a blower or a pump. If an SJAE is used, it needs steam to pass through its venturi to generate vacuum for the condenser 710.

The steam supply is provided from the auxiliary boiler to the SJAE at startup; once the system is running, it is no longer needed, and the system cycle steam can provide the necessary steam to generate vacuum for the condenser 710.

Another application for steam is gland steam 740 for the bearings of the shaft of the steam turbine 700. Gland steam is a conventional use of steam in such systems, to preserve the pressure of the steam turbine and inhibit it from going to ambient temperature.

As the steam turbine comes to steady state and steam is being generated in normal operation, the gland steam supply 740 is not needed, and it can be shut off.

Systems with a Thermal Energy Storage (TES) System

Figure 8:
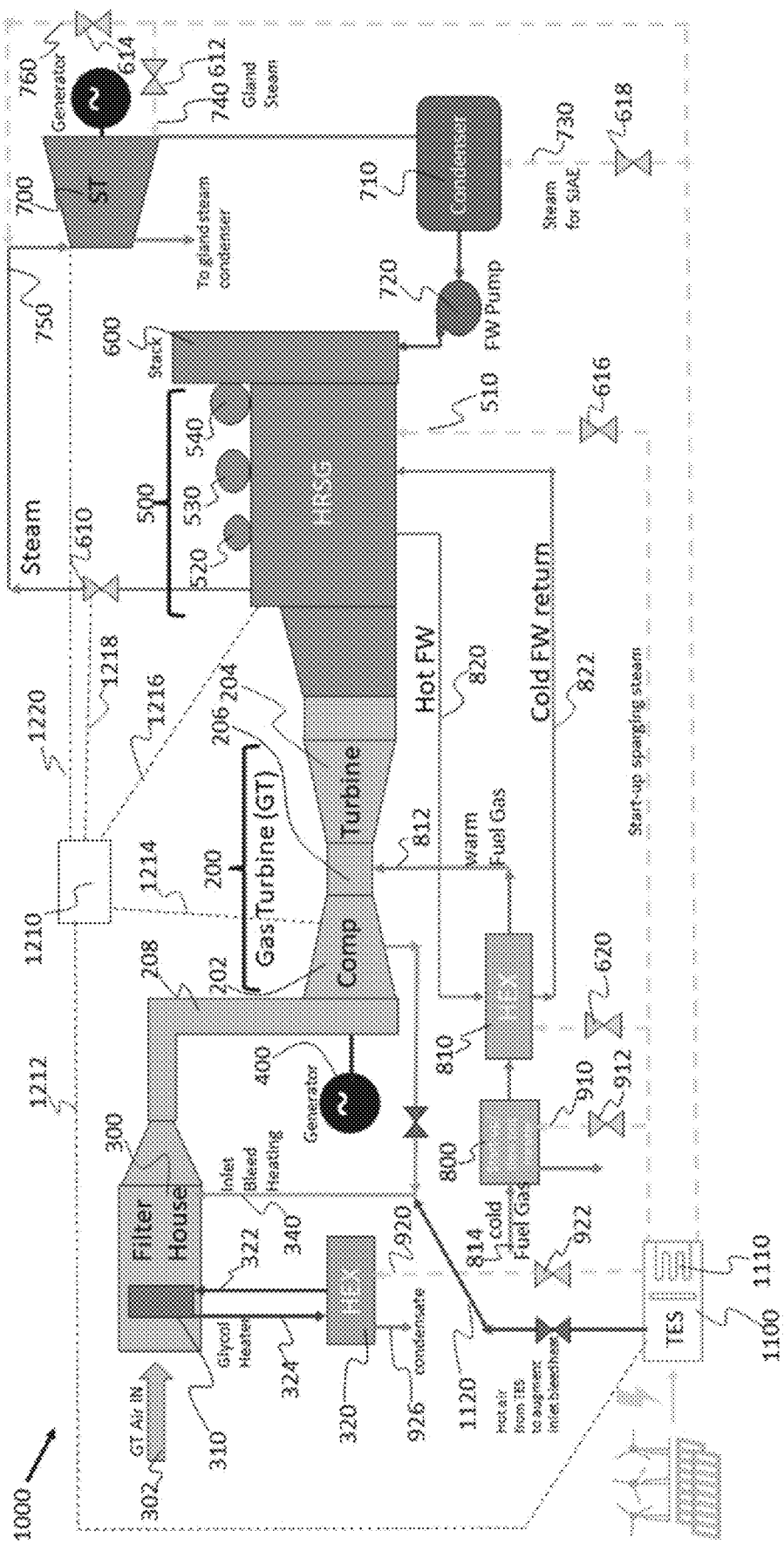
FIG. 8 illustrates an example view of a combined cycle system with a TES according to the example implementations.

FIGS. 8-19 illustrate the use of a TES system 1100 (also referred to herein as a heat battery) powered by clean energy, provided as the source of heat as shown in various manners. Incorporating a TES system 1100 can improve the flexibility, efficiency, and environmental performance of combined cycle gas turbine (CCGT) power plants. Specifically, introducing a TES system 1100 into the steam generation and distribution system can enable a steam turbine 700 to operate independently of the gas turbine 200 and heat recovery steam generator (HRSG) 500. This configuration enhances plant responsiveness, reduces emissions, and supports reliable power delivery under variable grid and load conditions. While this schematic of FIG. 8 shows several possible applications of TES system in a CCGT power plant, other implementation or combinations using a TES system may also be implemented.

The plant includes a triple-pressure HRSG with reheat, and multiple operational pathways for steam generation and delivery to the steam turbine. The system utilizes various forms of auxiliary steam including sparging steam, gland sealing steam, and motive steam. Steam sparging is used to maintain drum pressure and condenser vacuum during startup or when operating without the gas turbine.

To facilitate control, valves 610, 612, 614, are strategically positioned to allow or restrict steam flow from the HRSG and the heat battery to the steam turbine. Additional control elements include valves for isolating the HRSG, enabling bypass modes, and managing multiple steam sources (e.g., auxiliary heaters, glycol heaters for cold weather operation, and startup heaters).

By way of non-limiting example, the steam cycle for the system as shown in FIG. 8 may be a conventional triple-pressure steam cycle, with high pressure, intermediate pressure, and low pressure steam as mentioned above. The full detail of the steam piping is not shown in FIG. 8 for ease of illustration; it will be understood that this is a simplified schematic representation of such a triple-pressure steam cycle system.

The dashed steam lines in FIG. 8 can all be provided with steam and/or heat as appropriate using clean, renewable energy from a thermal energy storage system according to the present invention, in particular as described in applicant's U.S. Pat. No. 11,530,625 and related patents and applications, or other sources of clean-energy heat and/or steam, as will be understood in the discussion below relating to FIGS. 9-19.

In one implementation, a startup heater 800 is particularly useful when startup emissions and startup time are subject to stringent limits. The startup and/or dew point heater 800 may employ other heat inputs. In conventional systems, if there is a plenty of auxiliary steam available through the auxiliary boiler 900, one can employ steam-type heating of the startup heater 800. In other situations, for instance where sufficient auxiliary boiler steam is not available, one might employ an electric heater, instead or in addition, to heat up the fuel gas. Other suitable options may also be used for the startup heater.

The condensates from the return line 926 may go back to a condenser, or to a drain, or to a separate dedicated condenser for the auxiliary boiler 900. This is a system-dependent design choice.

In conventional systems, the auxiliary boiler 900 can be fuel fired (e.g. natural gas fired or oil fired), or could be an electric boiler connected to the grid.

It should be understood that for any of the embodiments herein, there may be a control system 1210 that may be operably linked such as indicated by dashed lines 1212, 1214, 1216, 1218, and/or 1220 to various components in the system 1000 to manage the operation of the overall system. For ease of illustration, the control system 1210 is not shown in every figure herein.

Figure 9:
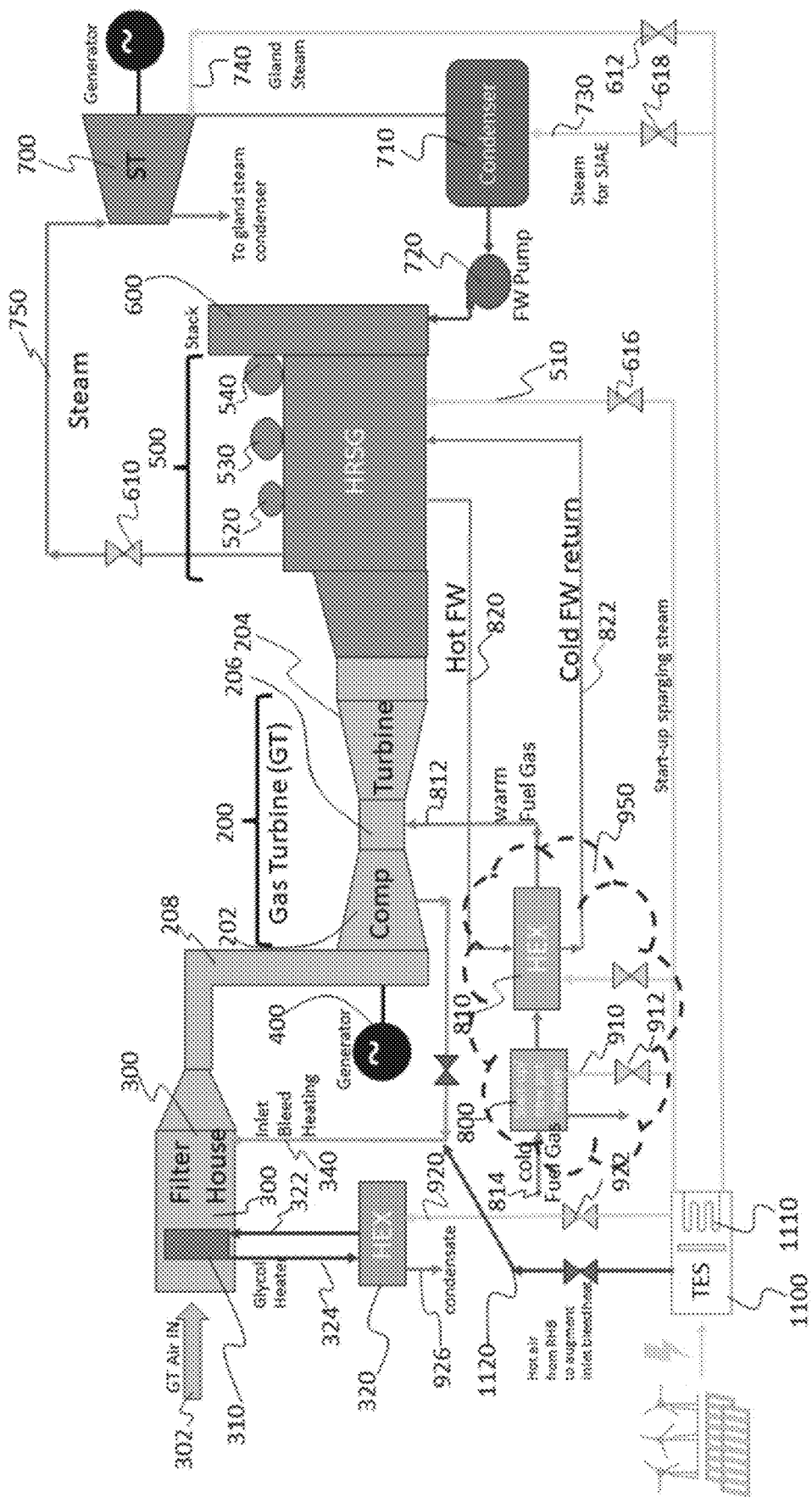
FIGS. 9 to 15 illustrate various views of system(s) according to the example implementations.

FIG. 9 shows (in the "cloud" region 950) the TES system 1100 with a heat exchanger 1110 such as a steam generator, e.g. a once-through steam generator. The system 1100 provides both hot air, gas, or other fluid and steam via a heat exchanger 1110 such as but not limited to a steam generator. It should be understood that the heat exchanger 1110 may be integrated with the TES, or optionally, located spaced apart or separate from the TES 1100 but fluidically coupled. Heat for the heat exchanger 810 is provided via hot water and/or steam from the TES system 1100 as shown, replacing the auxiliary boiler 900 of conventional systems or other source of nonrenewable or fossil fuel generated heat.

FIG. 9 show hot water or steam from TES system 1100 used to heat fuel gas during start-up/normal operation. This may be applicable for combined cycle or simple cycle operation. Hot water heated by energy from the TES can augment fuel gas heating by using heated HRSG feedwater during normal operation.

When the system is in normal operation and the start-up/dew point heater 800 is not being used, the TES system 1100 can still be used, in this case to augment the heating of the cold feedwater 822, so that the resulting hot feedwater 820 is provided at a significantly higher temperature than it would be without that augmentation. For example, if the heated feedwater 820 is normally about 200° C., using the TES system 1100 as a source of augmentation heat can raise the temperature of that heated feedwater to 300° C. or higher. This increases the efficiency of operation of the HRSG 500.

In a simple cycle application such as in FIGS. 16-19, the HRSG 500 is not present, so the loop (i.e. the green loop) of hot and cold feedwater is not present. In that case, the TES system 1100 can act as a dedicated steam supply source for the heater 800.

Figure 10:
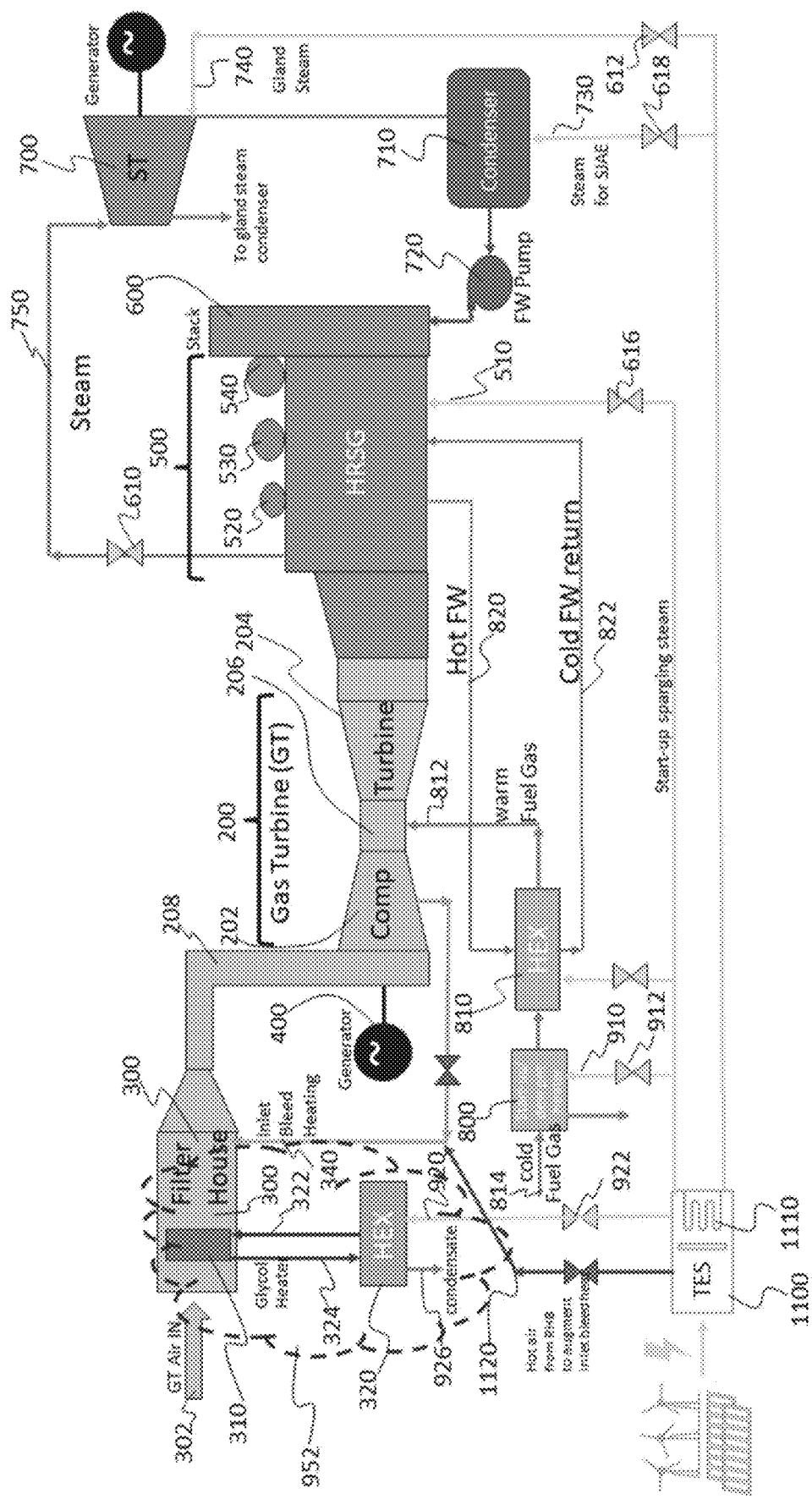

FIG. 10 shows (in the "cloud" region 952) the replacement of conventional heat sources (such as a fossil fuel fired auxiliary boiler) with clean energy from TES system 1100. The glycol loop can otherwise remain in conventional configuration, i.e. the TES 1100 can directly replace fossil fuel heat. Hot water or steam heated by the TES system 1100 can be used to heat glycol heaters for start-up and normal operation in extreme cold ambient.

Figure 11:
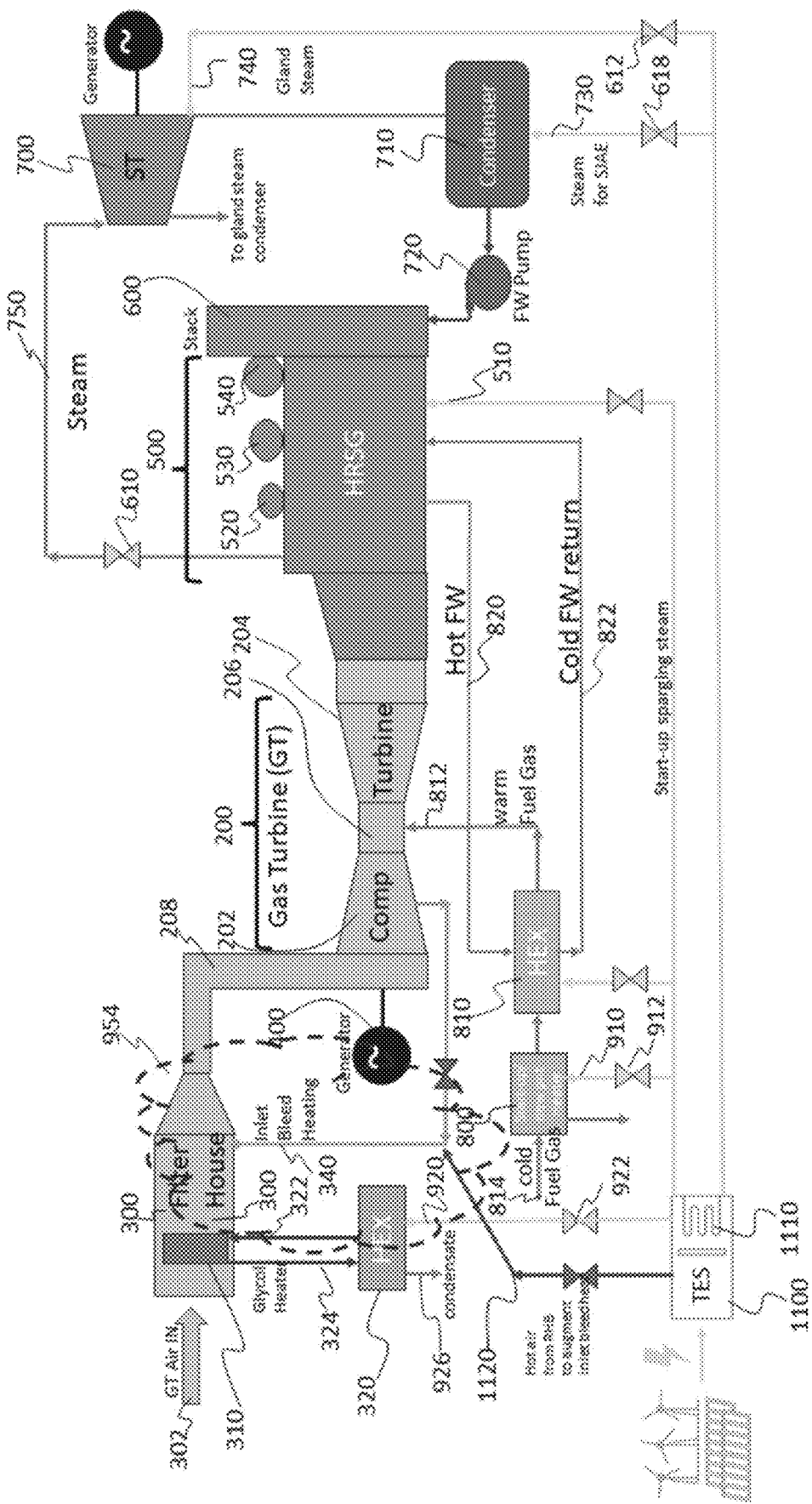

FIG. 11 illustrates the replacement of heat for the air input to the compressor 202 with heat from the TES system 1100. In this configuration, in addition to providing the TES system 1100, a hot air conduit 1120 is added to a conventional system such as in FIG. 7, which is used to augment the inlet bleed heat using hot air from the TES system 1100 as shown in "cloud" region 954. This increases the temperature of the input air for the compressor 202, which increases the overall efficiency of the system. Such augmentation of the inlet bleed heat is not available or practical using conventional designs and boilers. Hot air or fluid from TES system 1100 can be either used to augment or completely replace inlet bleed heat (IBH) used by GT for operation reasons and requirements.

With this arrangement, startup can be accomplished without a glycol heater either present or operational, since the TES system 1100 provides sufficient heat for the air input to the compressor 202.

In this configuration, during normal operation one could continue to employ the inlet bleed heat to ensure a desired level of hot air at the inlet. Alternatively, one can disengage the inlet bleed heat during normal operation and provide hot air to the filter house 300 only from the TES 1100, continuing to increase and maintain the efficiency of the compressor 202 as compared with simply using cold ambient air.

Using hot air in this fashion rather than steam can result in higher efficiencies, since the hot air is hotter than the steam would be. An example increase in temperature of the input air might be 10-20° C.

Figure 12:
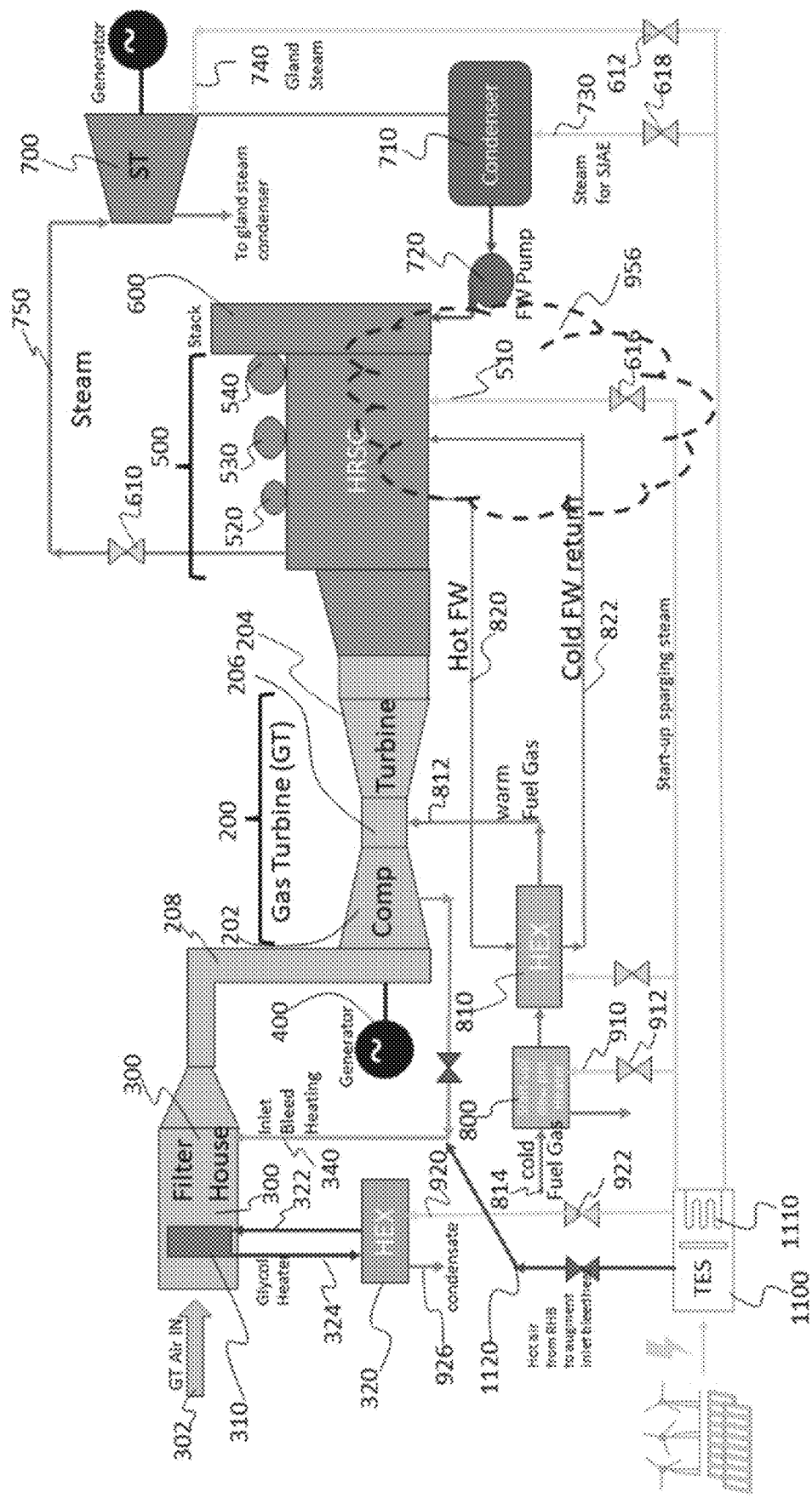

FIG. 12 depicts the provision of sparging steam 510 (in "cloud" region 956) to the HRSG 500, particular useful for startup operations, again eliminating the auxiliary boiler and any use of fossil fuels for this process, replacing the energy with clean energy from the TES system 1100. Steam from TES system 1100 may be used to pre-heat HRSG during start-up. This may be desired for decreasing start-up time. One example is high pressure sparging steam.

Figure 13:
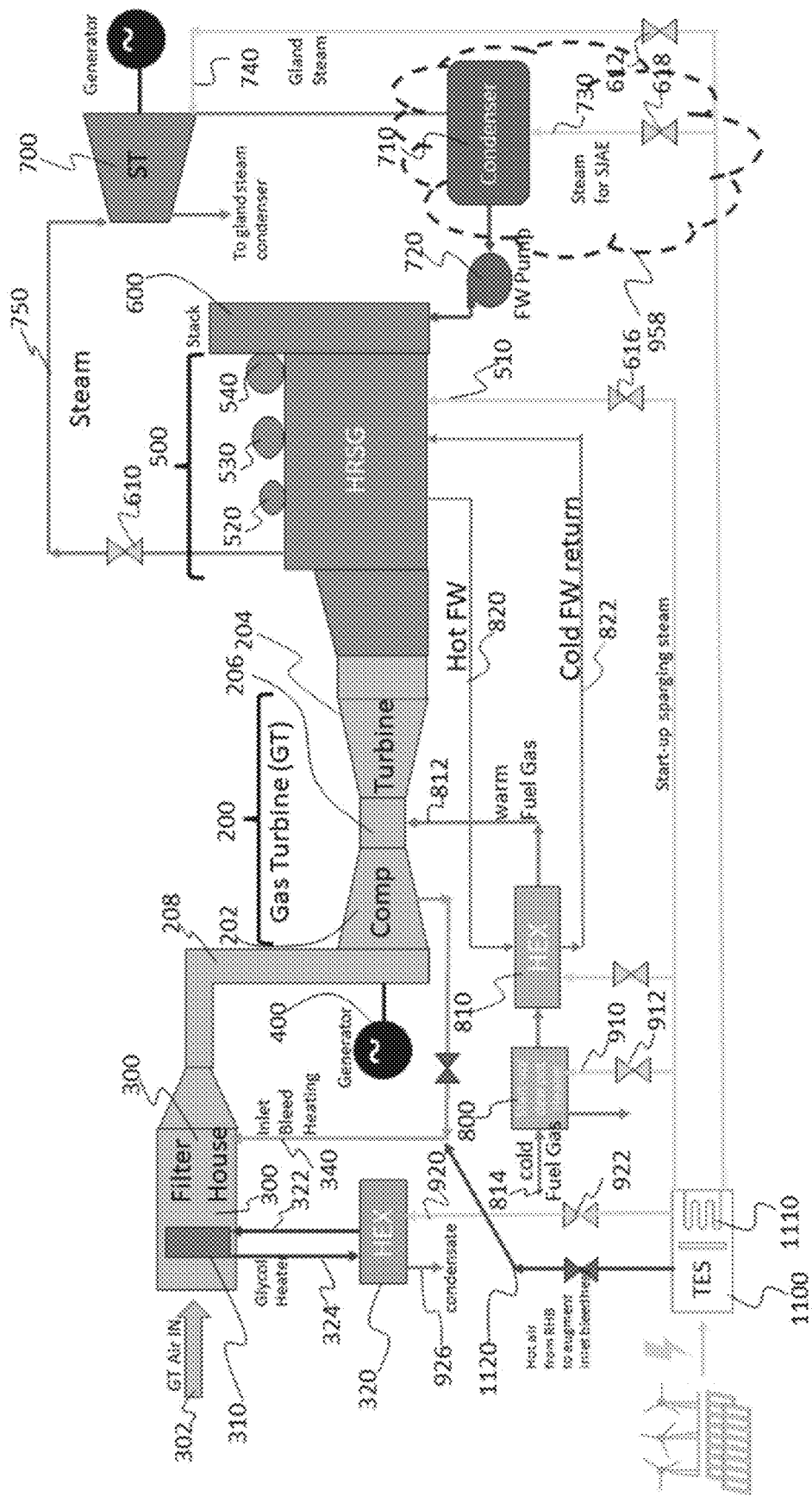

FIG. 13 shows the use of the TES system 1100 such that, instead of using an auxiliary boiler to provide steam for the Steam Jet Air Ejector (SJAE) for the condenser, the TES system provides steam to the condenser for the startup process, as shown in the "cloud" region 958 of that figure.

Figure 14:
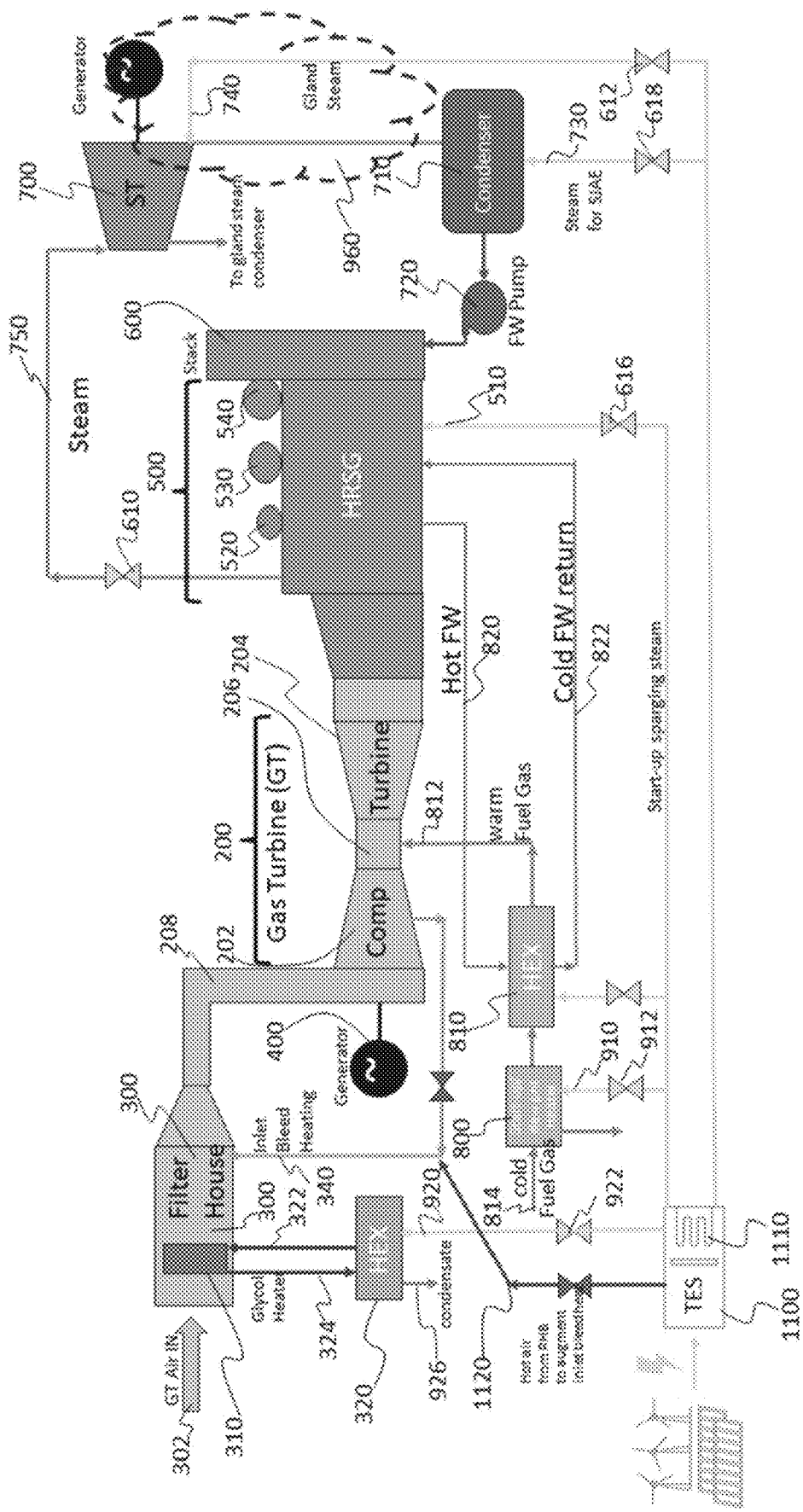

FIG. 14 shows (in "cloud" region 960) the provision of steam from the TES system 1100 to the gland steam for startup operations, again substituting steam derived from clean, renewable in energy in place of fossil fuel derived heat or steam. Hot water or steam heated by the TES system 1100 can be used to provide gland sealing steam during shut-down and start-up periods.

Figure 15:
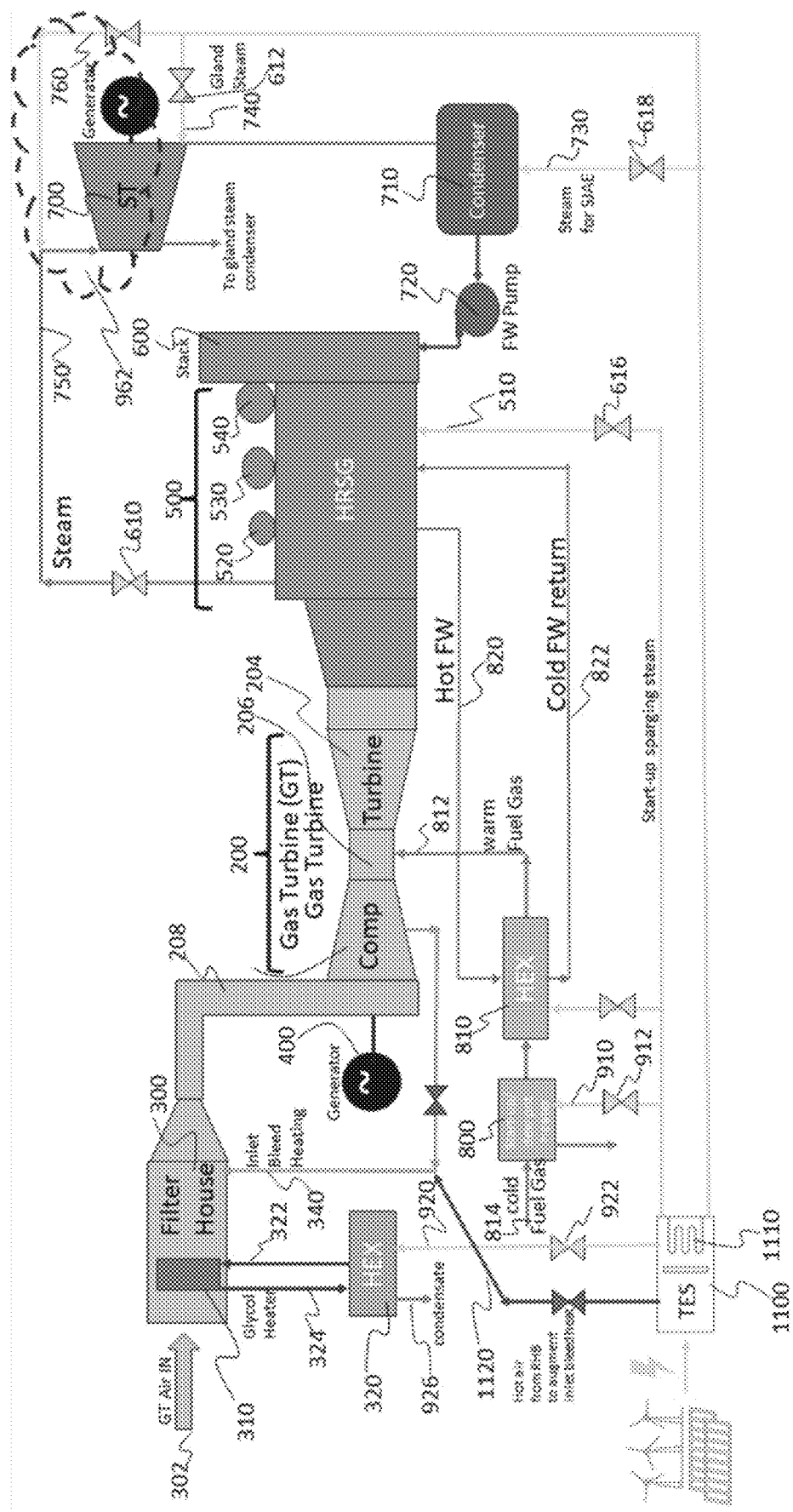

FIG. 15 shows that H P, IP or L P steam input to the steam turbine 700 can be augmented with steam from the TES system 1100, which can increase the efficiency of operation of the ST 700. This could be particularly advantageous if a power plant operator wishes to augment the steam in the steam turbine during times of higher prices for the steam (e.g. high-demand times for electricity, such as evening hours), which increases the user's revenues during those times. TES heated working fluid such as steam can be augmented with H P, IP or LP steam input to Steam Turbine. Optionally, the system can also be used to run the steam turbine stand alone on steam heated by the TES system 1100 while GT is OFF. This can keep the steam turbine warm for subsequent gas turbine 200 start-up.

Another application is that, when the gas turbine 200 is not operational, the steam turbine 700 can still be run, e.g. at a very low level (e.g. 5-10% load), but still generate power, due to providing clean-energy steam from the TES system 1100. This low output can be sold as minimum power to the grid, for example. It also keeps the steam turbine 700 warm, which enables faster startup in case of a sudden increase in power demand.

As an example, the term "cold start" may refer to startup after the steam turbine and the whole power system have not been operational for several weeks, such that the entire plant is at ambient temperature. In this case, the steam turbine may be started up as described, using heat from the TES system 1100, and the gas turbine might for example be started 30-60 minutes thereafter. A "warm start" might be after 8 hours to two weeks of nonoperation, in which case the process of starting the gas turbine might follow by 15-20 minutes. A "hot start" might follow 8 hours or less of nonoperation, in which case the startup of the gas turbine is even quicker.

Figure 16:
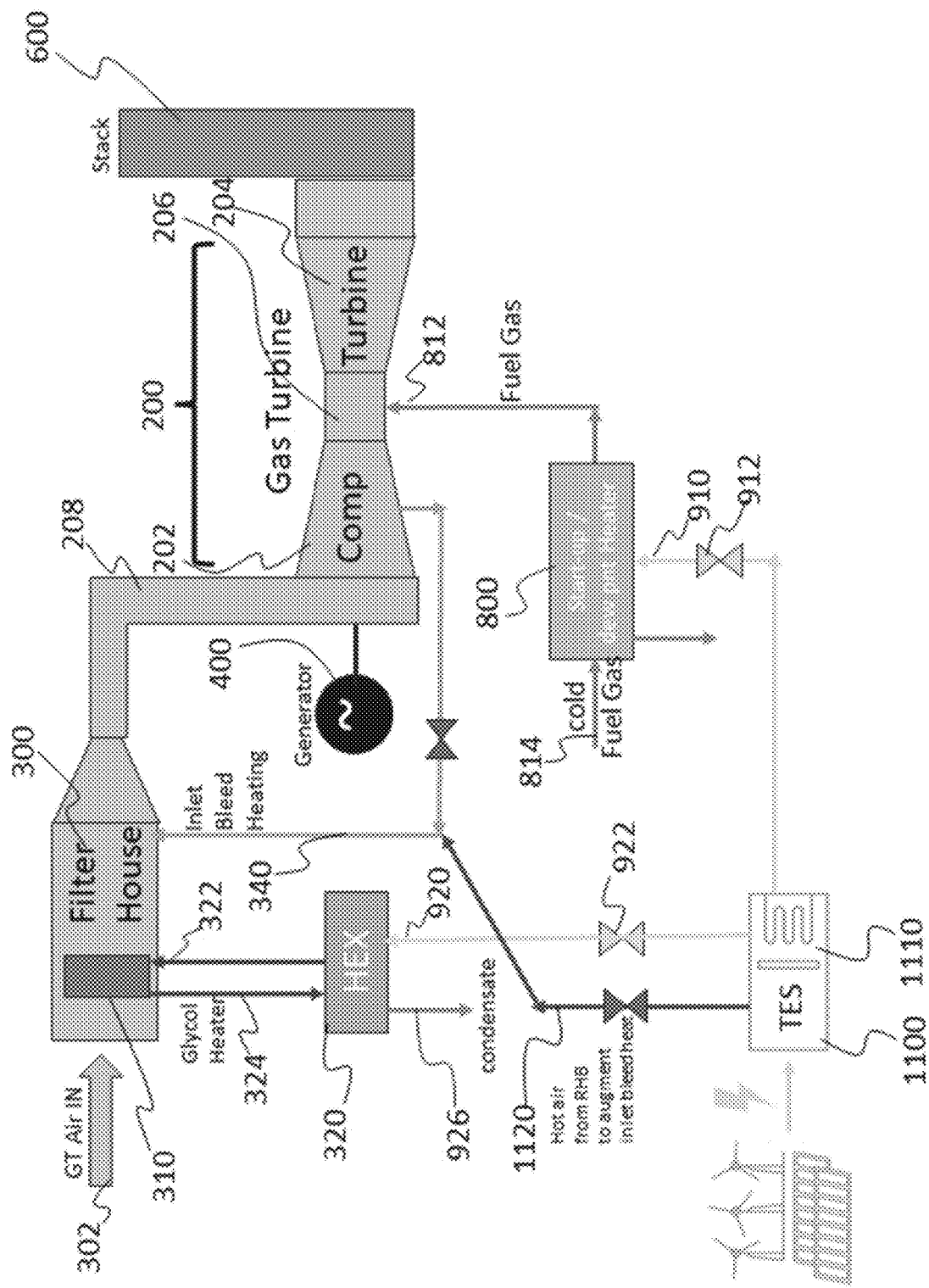
FIG. 16 illustrates an example view of a simple cycle system with a TES according to the example implementations.
Figure 17:
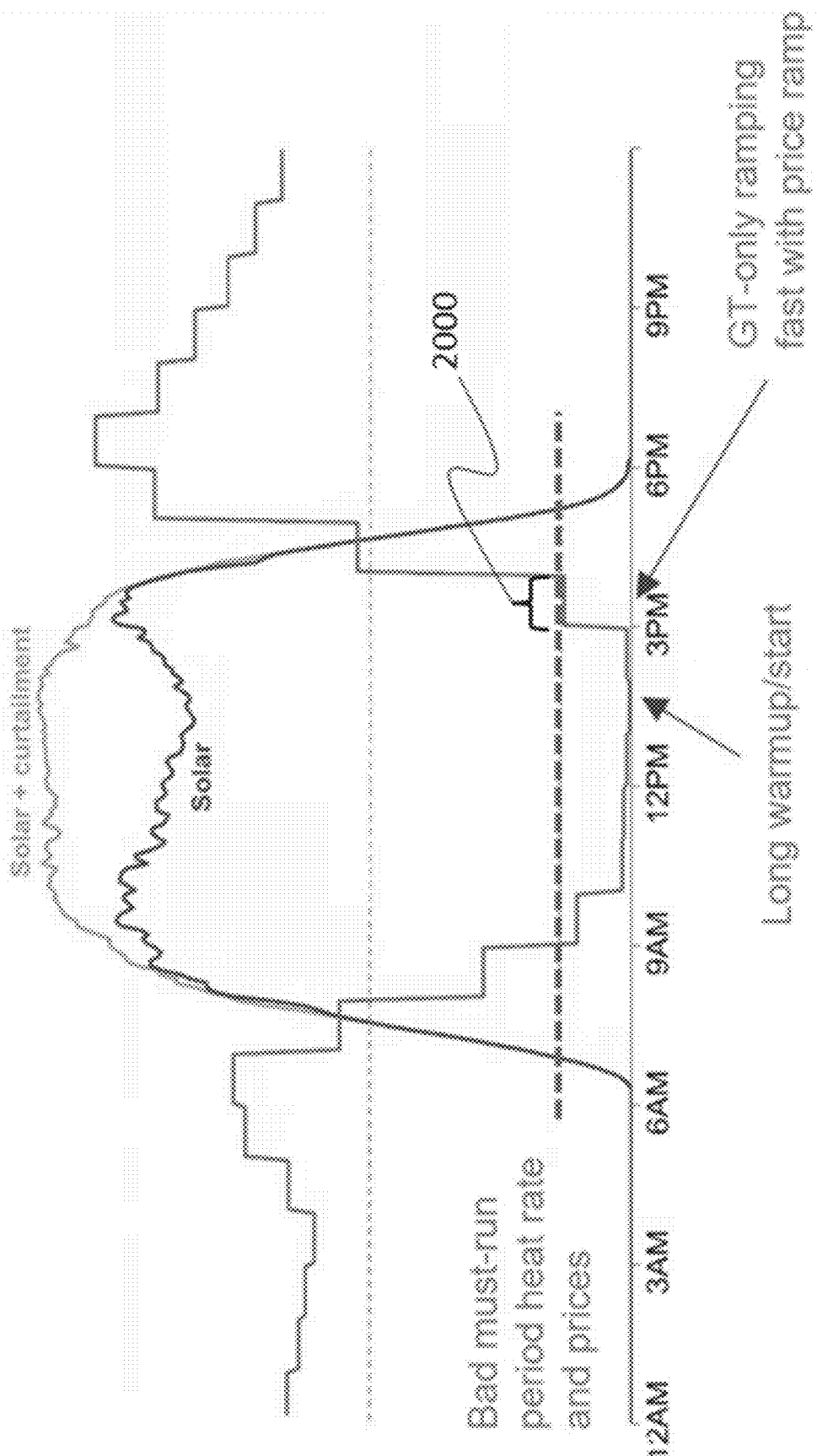
FIG. 17 illustrates an example view of an electricity price and production graph.

FIG. 16 depicts an implementation similar to the foregoing FIGS. 8-15, but in the context of a simple cycle power plant rather than a combined cycle power plant, i.e. absent the HSRG 500. Otherwise, the principles and operations described above are the same.

FIG. 16 shows a simple cycle system schematic with a TES system 1100. Simple Cycle Operation may need Inlet Air heating for extremely cold ambient for either start-up support or continuous operation. Glycol heater may be used heat inlet air. Glycol receives heat from the TES. TES steam can also be used to heat FG for dew point heating and/or start-up heating. TES hot air can be used to augment or replace the inlet bleed heat supply. This may be particularly of advantage during start-up.

Enhanced Power Plant Responsiveness

In conventional combined cycle power plants, the start-up time of the steam turbines (ST) can be significant, typically on the order of one hour or more. Typically, a gas turbine operating first at low output is used to warm-up the steam system including heat recovery steam generator (HRSG) and the steam turbine. When operating at low output, gas turbines typically consume more fuel per unit of power output than when operating at full power. Such warm-up periods often occur when the market price for selling electricity is low as indicated in the area 2000 in FIG. 17. Because of the long start-up time during such adverse pricing, operating the gas turbine under such conditions results in inefficiencies and suboptimal economics, as the gas turbine consumes excess fuel while selling electricity at minimal value or sometimes at no value.

When grid demand is low, such as during midday hours in geographic areas with high solar penetration, these power plants may betaken offline. However, electricity grids require a minimum amount of spinning turbine-based power generation for reliability, and thus such power plants may be required to operate during high-renewables hours. When the power plants are operated during such low output "off-design" conditions, the gas turbine operates less efficiently, consuming more fuel per megawatt-hour produced, and often receives inadequate compensation for ancillary services provided. The power delivered during these midday high-solar periods intrinsically reduces the amount of solar power the grid can accept locally, increasing solar power curtailment. This situation imposes a triple penalty of low revenues, high fuel costs, and more difficulty integrating renewables into the system.

Ambient conditions on days with high temperatures may also reduce the efficiency and output of the gas turbine due to decreased air density. To compensate for this reduction, power plants may employ duct burners or other gas heaters to provide additional heat to raise steam output to a level that enhances overall plant performance. Such duct firing is inherently less efficient, delivering heat only to the steam turbine rather than the combined cycle, and contributes to increased nitrogen oxide (N Ox) emissions. In at least some implementations, the displacement of the duct burner or other heater in the HRSG with TES generated steam reduces nitrogen oxide (NOx) emissions and allows the hybrid power generation system to maintain or increase power output during high ambient temperature conditions without exceeding environmental emissions limits.

Figure 18:
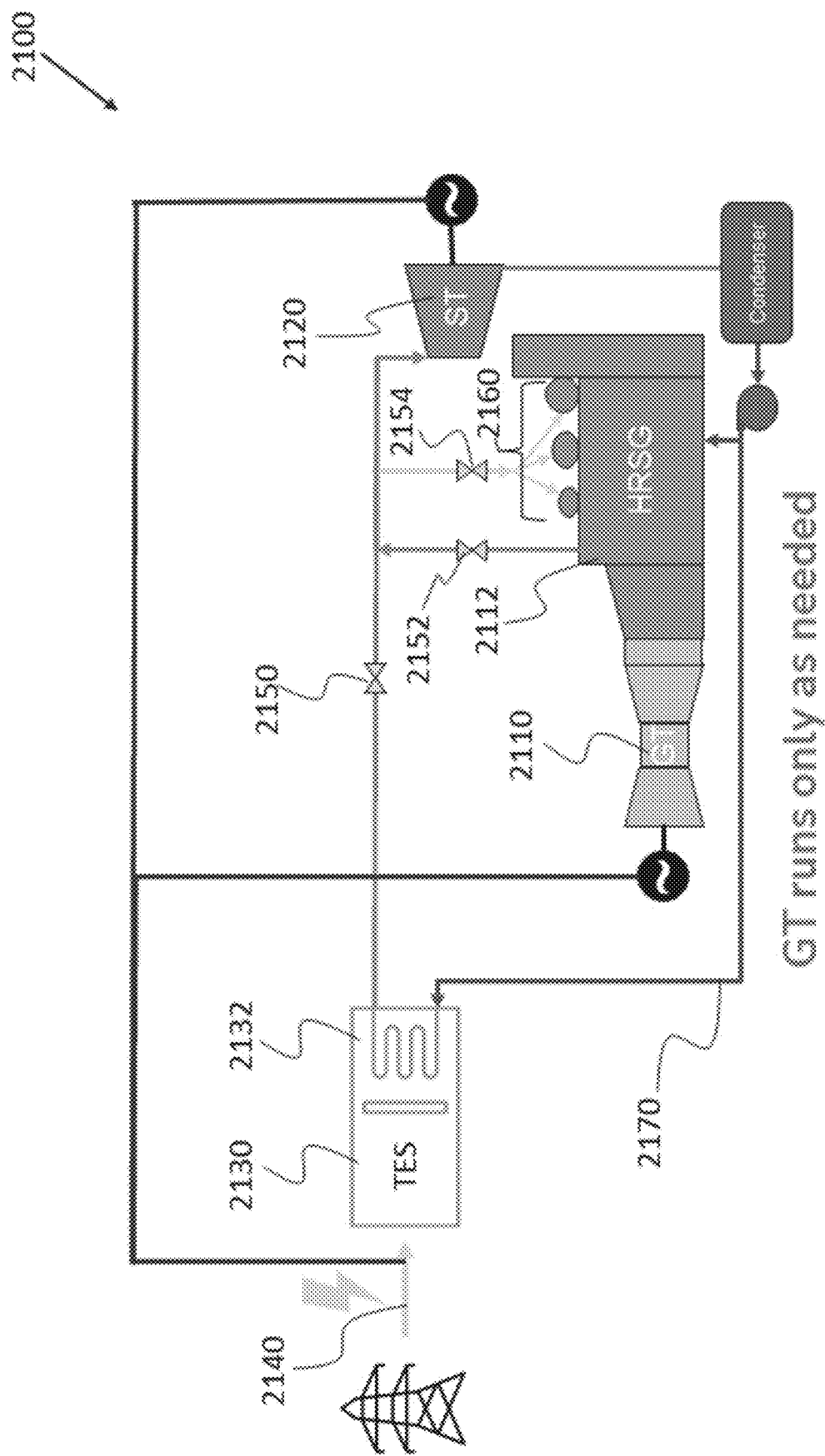
FIG. 18 illustrates an example view of a combined cycle system with a TES according to the example implementations.

FIG. 18 shows a configuration of a combined cycle power generation system 2100 with improved responsiveness that improves the performance of such power systems under such adverse conditions. The system 2100 includes a gas turbine 2110, a heat recovery steam generator (HRSG) 2112, a steam turbine 2120, and a thermal energy storage (TES) system 2130. The TIES system may be integrated with or fluidly coupled to a heat exchanger 2132. The TES system may be charged using energy from a renewable source or using grid electricity 2140. Heat output from the TES system 2130 is used to generate steam by way of a heat exchanger 2132.

Various valves 2150, 2152, and 2154 can be used to change the operating modes of the power plant. In one operating mode, the steam turbine 2120 is using the steam heated by the heat output from the TES system 2130 while the gas turbine is in an effectively offline condition. This mode of operation enables the steam turbine generator system to deliver grid services including reserve and inertia, while burning no fuel. The TES system may be charging both from the grid and from power generated by the turbine. The valves 2152 and/or 2154 may be closed to direct steam to the steam turbine 2120. This maintains the steam turbine in a spinning state during periods when the gas turbine is in the effectively offline condition. The power output of the steam turbine and the operation of the gas turbine 2110 can be selectively controlled in response to detection of a predefined system condition such as but not limited to an energy drop from the renewable energy source below an availability threshold, a TES system drop below a heat output threshold level, a real-time or forecast electricity market price increase above a predetermined price threshold level, a command from a system operator, and/or a power demand increase above a demand threshold level.

When demand increases or market prices rise, the gas turbine 2110 can be rapidly activated because the HRSG and steam turbine are in the hot state, while the steam turbine remains online and ready due to prior TES system operation. This avoids the conventional warm-up penalty and allows the gas turbine 2110 to start faster and operate at or near its design point, thereby improving fuel efficiency and reducing wear. In this non-limiting example, maintaining the steam turbine 2120 in a spinning state at or near its minimum operational load capacity through the use of energy from the TES system, enables the gas turbine 2110 to boost the steam turbine 2120 to reach a substantially full output within a startup time period of about 15 minutes or less from the detection, substantially without delay associated with warming up the steam turbine.

In some applications, the TES system 2130 need only support the steam turbine's minimum operating level. This configuration enables the steam turbine to continuously provide grid services without requiring combustion, powered at all times by a combination of steam from the TES system and steam from the gas turbine HRSG. This configuration effectively makes the plant more responsive to grid dispatch, with gas turbine ramp rate response more like an open-cycle gas turbine while maintaining the higher efficiency of a combined cycle plant. A control system may adjust both the operation of the turbines and the charging input to the TES in response to dispatch commands, which can further increase plant responsiveness and enable participation in fast-response capacity market tranches.

As discussed, the system 2100 further incorporates multiple steam routing valves 2150, 2152, and 2154, which enable selective isolation of steam from the HRSG 2112 and from the TES system 2130. Sparging systems 2160 are provided to enable steam from the TES to be introduced to maintain drum temperature and maintain condenser vacuum during standby operation. The plant 2100 also may include intermediate pressure steam routing 2170 back to the TES system 2130 for reheating before delivery to the turbine, enabling reheat-cycle operation.

Figure 19:
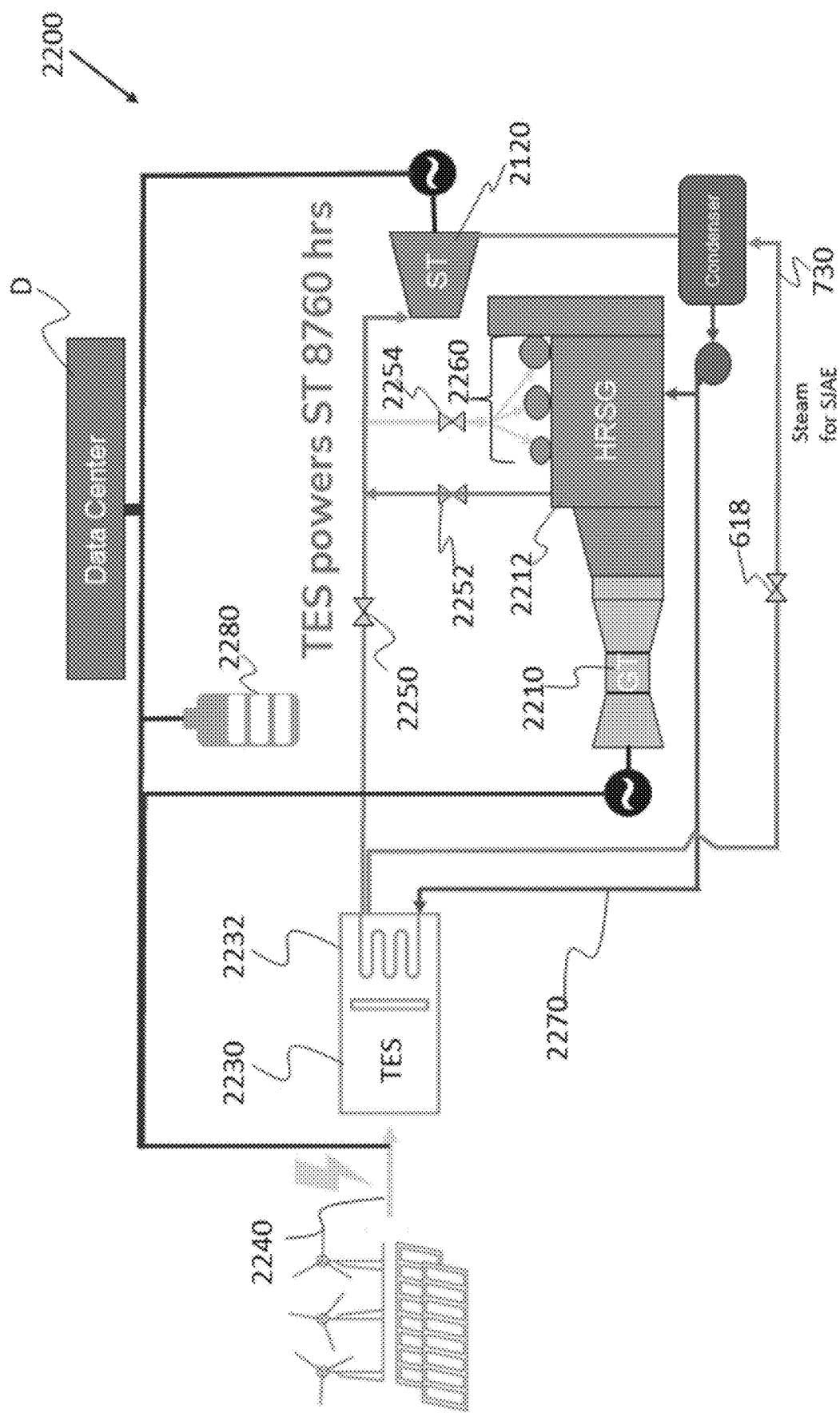
FIG. 19 illustrates an example view of a combined cycle system with a TES and electric battery storage according to the example implementations.

Although not shown for ease of illustration, the system 2100 may also include a controller similar to control system 1210 coupled to various system components in FIGS. 18 and 19 to maintain overall system control in the manner as set forth in various methods described herein.

This architecture increases the overall value of the power plant 2100 by enhancing responsiveness, reducing emissions, and enabling cost-effective participation in dynamic electricity markets.

Application in Microgrids and AI Data Center Power Systems

FIG. 19 shows another implementation of a power plant 2200 integrating a TES system into a system powering a data center that includes an electric battery backup system and a CCGT system. The system 2200 includes a gas turbine 2210, a heat recovery steam generator (HRSG) 2212, a steam turbine 2220, and a thermal energy storage (TES) system 2230. The TES system 2230 may be integrated with or fluidly coupled to a heat exchanger 2232. The TES system may be charged using energy from a renewable source or using low-cost grid electricity 2240. Heat output from the TES system 2230 is used to generate steam by way of a heat exchanger 2232. The system 2200 may further incorporate multiple steam routing valves 2250, 2252, and 2254, which enable selective isolation of steam from the HRSG 2212 and from the TES system 2230. Sparging systems 2260 are provided to maintain drum temperature and ensure condenser vacuum during standby operation. The plant 2200 also supports intermediate pressure steam routing 2270 back to the TES system 2230 for reheating before delivery to the turbine, enabling reheat-cycle operation, though for simplicity this is not shown in the figure.

By storing thermal energy from low-cost grid or renewable source electricity, the TES system 2230 enables continuous or standby operation of the steam turbine 2220 independent of the gas turbine 2210. This allows the plant 2200 to maintain a continuous operation capability while minimizing the combustion of fuel, avoiding both inefficiency and emissions.

The present implementation of the system 2200 is particularly applicable to distributed power systems, such as those used to support data centers, especially where grid access is unavailable, limited, or unreliable. In such scenarios, it is common to configure a microgrid which may be fully or partially "islanded", relying on local generating resources rather than the wider grid. It is common to install an on-site fuel-fired power plant to deliver firm power and to supply the needed services such as frequency stability, inertia, short-circuit current, and voltage stability. Combined-cycle power plants may offer the highest fuel efficiency and cost effectiveness for such applications. However, operators of these facilities increasingly seek pathways to achieve net-zero or zero-carbon power generation.

Accordingly, substantial amounts of wind or solar generation may be interconnected with the microgrid, and electrochemical grid batteries may further extend the hours of renewable generation. But the microgrid may require the service of at least one spinning generator at all times, and the use of a conventional combined cycle plant to provide this service requires a minimum operating load—the plant cannot be completely shut down during times of high renewable output (e.g., solar generation during daylight hours) without compromising grid stability and power quality. Instead it is operated at a minimum output; such minimum output level, which may be 20% or more of full power output, limits the amount of renewable electricity contribution to total generation. Furthermore, operating a combined-cycle power plant at low output is well known to reduce its efficiency incurring fuel consumption penalties of 20% or more.

These facilities desire to maintain "must-run" generation status to supply essential reliability services such as voltage and frequency control but at the cost of having to activate combustion based systems to provide such grid reliability. Unless fuels other than fossil fuels are employed in such a configuration, the achievable clean energy fraction is limited to approximately 80% or less, with diminishing economic returns and increased energy curtailment at higher levels of renewable penetration. The use of non-fossil fuels powering combined-cycle generation is today sharply limited by both the cost and availability of such fuels; accordingly, enabling the operation of one or more turbines without fuel combustion is uniquely valuable in this application.

Integration of a TES system 2230 into this architecture fundamentally alters the clean energy operating profile. During periods when renewable power 2240 (e.g., photovoltaic or wind) is available, the gas turbine 2210 may be shut down entirely while the steam turbine 2220 remains operational using steam generated entirely or substantially entirely from the TES system 2230. When the battery charge in electric battery 2280 is depleted, the TES system is below a threshold level, and renewable power is unavailable, the gas turbine 2210 resumes operation, ensuring continuous power delivery to the load. By powering the steam turbine from the TES using stored renewable electricity, the grid stability and inertia services can be provided without fuel combustion. Accordingly, the gas turbine will be operated only when it is needed to supply electricity—when wind, solar, and battery output are lacking. This significantly reduces fuel consumption and enables meaningful progress toward fully decarbonized power operation. Powering the steam turbine with stored electricity enables the microgrid system to operate stably without combustion, except when wind and solar resources are inadequate. U se of the TES system 2130 is used to achieve substantial emission reductions by replacing the use of combustion systems when there is sufficient heat in the TES system 2130. Optionally, the TES system 2130 may be one that can charge and discharge simultaneously so that the heat from the TES system 2130 can be used to generate steam for the steam turbine 2220 and charge the TES system 2130. Power plants using such TES systems can achieve clean energy fraction of approximately 80% or higher.

The described architecture enables continuous power plant operation with the following flexible modes:
  Steam turbine powered by heat from the GT
  Steam turbine powered by heat from the TES system
  Steam turbine powered by a combination of both sources
  Optional operation with or in place of duct burners
  The system may include a control scheme capable of selecting the most economically and environmentally optimal mode based on current conditions. Such a controller could evaluate configurations including GT-only, TES-only, GT+TES, GT+duct burner, and GT+TES+duct burner. The inclusion of such a controller enables dynamic operation that minimizes emissions and fuel use while satisfying reliability constraints.

To support proper system operation, control valves should be included to isolate and direct steam from both the HRSG and the TES system, enabling steam sparging and reheating flows if a reheat cycle is employed.

This configuration is not only expected to enhance system resilience and efficiency but also paves a commercially and technically viable path toward achieving 100% clean power operation in demanding use cases such as AI data center microgrids.

Summary of Claim Areas for Inventive Implementations
TES with a Raft Support Layer
A combined cycle power plant, including:
  a gas turbine (GT) having a compressor section and a turbine section;
  a combustion chamber filter house coupled to the GT;
  a heat recovery steam generator (HRSG) coupled to the GT;
  a steam turbine coupled to the HRSG;
  a condenser coupled to the steam turbine;
  a feed water pump coupled to the condenser and the HRSG;
  a fuel gas input into the GT;
  a heat exchanger that warms the fuel gas using hot feed water from the HRSG, thereby improving the efficiency of the GT cycle; and
  a thermal energy storage (TES) system providing thermal energy to the heat exchanger.
A combined cycle power plant, including:
  a gas turbine (GT) having a compressor and a turbine;
  a combustion chamber coupled to the GT;
  a heat recovery steam generator (HRSG) coupled to the GT;
  a steam turbine coupled to the HRSG;
  a condenser coupled to the steam turbine;
  a feed water pump coupled to the condenser and the HRSG;
  a fuel gas input into the GT;
  a start-up heater that heats the fuel gas above its dew point, particularly applicable in cold ambient conditions; and
  a thermal energy storage (TES) system providing thermal energy to the startup-heater and HRSG.
A combined cycle power plant, including:
  a gas turbine (GT) having a compressor and a turbine;
  a combustion chamber coupled to the GT;
  a heat recovery steam generator (HRSG) coupled to the GT;
  a steam turbine coupled to the HRSG;
  a condenser coupled to the steam turbine;
  a feed water pump coupled to the condenser and the HRSG;
  a fuel gas input into the GT;
  a heat exchanger that heats the incoming cold fuel gas; and
  a thermal energy storage (TES) system for heating the fuel gas during startup, wherein the TES is configured to heat auxiliary steam that is provided to the heat exchanger that heats the incoming cold fuel gas.
A combined cycle power plant, including:
  a gas turbine (GT) having a compressor and a turbine;
  a combustion chamber coupled to the GT;
  a heat recovery steam generator (HRSG) coupled to the GT;
  a steam turbine coupled to the HRSG;
  a condenser coupled to the steam turbine;
  a feed water pump coupled to the condenser and the HRSG;
  a fuel gas input into the GT;
  a thermal energy storage (TES) system; and
  a glycol heater that preheats intake air for the GT, particularly useful at system startup, wherein the glycol heater is heated using steam from the TES system.
A simple cycle power plant, including:
  a gas turbine (GT) having a compressor section and a turbine section;
  a combustion chamber coupled to the GT;
  a fuel gas input into the GT;
  a heat exchanger that heats the incoming cold fuel gas; and
  a thermal energy storage (TES) system for heating the fuel gas during startup, wherein the TES is configured to heat auxiliary steam that is provided to the heat exchanger that heats the incoming cold fuel gas.

A power plant system of any of the foregoing may be configured to include one or more of the following features:
  an inlet bleed heating loop that takes an extraction of compressed air from the compressor and heats the intake air for the GT.
  the glycol heater is used in conjunction with the inlet bleed heating loop during very low ambient temperatures.
  a start-up sparging steam system that preheats the HRSG using steam from an auxiliary boiler.

In at least some embodiments, a combined cycle power generation system is configured to enhance responsiveness by incorporating a thermal energy storage (TES) system that interfaces with conventional plant components, including at least one gas turbine, a heat recovery steam generator (HRSG), and a steam turbine. The TES system is configured to be charged using heat energy derived from electricity produced by a renewable energy source and/or drawn from an electrical grid. Once charged, the TES system releases stored heat energy to generate steam that is routed to downstream plant components.

Optionally, a portion of the steam generated from the TES system is directed to the HRSG to maintain a preselected temperature in one or more portions of the HRSG while the gas turbine remains offline. Simultaneously or alternatively, a second portion of the TES-generated steam is routed to the steam turbine, thereby maintaining the turbine in a spinning reserve condition (e.g., at synchronous speed without load) or in a low-load operating state during offline periods of the gas turbine. This operational approach reduces start-up time and thermal cycling stresses while enabling rapid ramp-up capability when full turbine engagement is needed. In one implementation, the steam turbine in the spinning state is maintained near a minimum operational load capacity by the TES system, thereby enabling the gas turbine to boost the steam turbine to reach a substantially full output within a startup time period, substantially without delay associated with warming up the steam turbine. Optionally, the startup time period is about 10 minutes or less. Optionally, the startup time period is between about 10 minutes to 15 minutes.

Optionally, a control system is further configured to detect predefined system conditions that may trigger initiation of the gas turbine. Optionally, these predefined conditions may include, for example, a drop in available energy from a renewable power source below a predefined threshold, a reduction in thermal output capacity of the TES system, a spike in real-time or forecasted electricity market pricing beyond a specified value, a command input from a human or autonomous system operator, or an increase in electricity demand beyond a predefined level. Upon detecting one or more of these conditions, the control system initiates operation of the gas turbine, optionally targeting its design-point efficiency for optimal performance.

Additional embodiments include maintaining the steam turbine in a reduced-output state while continuing to use TES-generated steam to keep the HRSG warm. The TES system may also be used to selectively drive the steam turbine within a defined power output range, even when the gas turbine is inactive. During gas turbine operation, TES-generated steam can be co-delivered with HRSG-produced steam to the steam turbine, thereby increasing combined steam mass flow and total power output.

Optionally, the system may also include control valves configured to selectively isolate steam flow paths originating from either the HRSG or the TES system. Steam routing decisions may be made based on economic factors, such as electricity pricing or fuel costs, as well as environmental or operational constraints. In some cases, steam sparging may be performed to maintain steam drum temperatures in the HRSG, and auxiliary steam systems may be used to sustain condenser vacuum during gas turbine outages.

Optionally, the steam turbine may remain synchronized to the grid throughout TES-based operation, allowing immediate load pickup when required. In certain embodiments, intermediate-pressure steam extracted from the steam turbine may be routed back to the TES system for reheating and subsequently reintroduced to the steam turbine, improving thermodynamic efficiency and enabling continuous closed-loop thermal cycling.

In additional embodiments, a clean-energy microgrid power generation system is provided, which includes at least one gas turbine, at least one heat recovery steam generator (HRSG), a steam turbine, and a thermal energy storage (TES) system. Optionally, the TES system is configured to be charged using heat energy derived from electricity generated by a renewable electricity source and/or an external electrical grid. Once charged, the TES system can dispatch stored thermal energy in the form of steam to enable various operating configurations within the microgrid.

Optionally, the steam turbine is selectively operated using steam generated by the TES system to maintain the steam turbine in an operational state even while the gas turbine is offline. This configuration allows the system to maintain stable electric power output and plant readiness while reducing reliance on continuous fossil-fuel combustion. Optionally, the gas turbine may also be selectively operated as needed to maintain a substantially constant power output, compensating for variability in renewable energy supply and fluctuations in TES output capacity. In some implementations, the system provides electrical reliability functionality without continuous gas turbine operation, thereby enabling a clean energy fraction exceeding about 80% for the hybrid power generation system in an islanded or weak-grid power environment.

This approach enables the delivery of continuous and reliable electric power without the need for continuous operation of the gas turbine, thereby facilitating a high clean energy fraction, exceeding approximately 80%, in either islanded mode or under weak-grid connection conditions. The system may further include an electric battery energy storage subsystem that receives electricity from the microgrid's generation assets or directly from renewable energy sources, adding a layer of electrical storage and balancing capability.

Optionally, the steam turbine is also configured to provide key microgrid reliability services, particularly during periods when the gas turbine is not operating. These services may include voltage stabilization, frequency regulation, circuit fault ride-through or response, and provision of system inertia, which are critical for microgrid stability.

Optionally, the gas and steam turbines may be operated in various configurations, including: (a) gas turbine only, (b) steam turbine only powered by the TES system, (c) simultaneous gas and steam turbine operation, (d) gas and steam turbines with supplemental steam from a duct burner in the HRSG, or (e) gas and steam turbines operating with additional steam supply from the TES system. A control system is employed to dynamically select between these configurations based on real-time assessments of power demand, renewable energy availability, fuel costs, emissions constraints, and battery state-of-charge.

In certain implementations, the gas turbine may be operated in a standby mode during daylight hours or other periods of strong renewable output and/or battery capacity. During these periods, the steam turbine continues to generate power using steam produced solely by the TES system, thus supporting low-emissions or fully renewable operation windows.

Optionally, the system is designed for flexible operation: the steam turbine may be operated using steam generated from the HRSG, from the TES system, or from a blend of both sources. This multi-source capability enables optimized operational strategies aimed at minimizing fossil fuel consumption and maximizing integration of clean or stored energy. In large-scale deployments, the system may include multiple gas turbines and HRSGs coupled to a single steam turbine, with the TES system ensuring continuous steam turbine operation even during shutdowns or maintenance events affecting one or more gas turbines.

In some implementations, the TES system is sized to provide a heat output that can run the steam turbine at 100% of the steam turbines maximum output. Optionally, the TES system is sized to provide a heat output that can run the steam turbine between about 5% to 90% of the steam turbines maximum output. Optionally, the TES system is sized to provide a heat output that can run the steam turbine between about 10% to 90% of the steam turbines maximum output. Optionally, the TES system is sized to provide a heat output that can run the steam turbine between about 20% to 90% of the steam turbines maximum output. Optionally, the TES system is sized to provide a heat output that can run the steam turbine between about 20% to 80% of the steam turbines maximum output. Optionally, the TES system is sized to provide a heat output that can run the steam turbine between about 30% to 70% of the steam turbines maximum output. Optionally, the TES system is sized to provide a heat output that can run the steam turbine between about 40% to 60% of the steam turbines maximum output. Optionally, the TES system is sized to provide a heat output that can run the steam turbine between about 10% to 80% of the steam turbines maximum output. Optionally, the TES system is sized to provide a heat output that can run the steam turbine between about 10% to 40% of the steam turbines maximum output. Optionally, the TES system is sized to provide a heat output that can run the steam turbine between about 10% to 30% of the steam turbines maximum output.

Optionally, the system may selectively deliver steam from the TES system to the steam turbine while one or more gas turbines are active, enabling an increase in total steam flow and power output under load-following or peak-demand conditions. During periods of elevated ambient temperature, when gas turbine output may be thermally derated, the TES system can provide supplemental steam to the steam turbine to maintain overall plant power output and grid support capability.

In at least one implementation, the microgrid power generation system described herein includes a hardware architecture that supports flexible, clean-energy-driven operation. The system includes at least one gas turbine, at least one heat recovery steam generator (HRSG) thermally coupled to the gas turbine, a steam turbine, and a thermal energy storage (TES) system. The TES system is configured to be charged with thermal energy generated from electricity provided by a renewable energy source-such as photovoltaic, wind, or hydroelectric generation—or from the external electrical grid.

Optionally, a steam generation subsystem thermally coupled to the TES system is used to convert the stored thermal energy into process steam. A control system coordinates the operation of the gas turbine and steam turbine in a variety of configurations to accommodate changes in renewable electricity supply, demand fluctuations, grid requirements, and emissions goals.

In one implementation, the control system is operable to selectively use TES-generated steam to operate the steam turbine independently while the gas turbine remains offline. This allows the microgrid to deliver clean electricity even in the absence of gas turbine combustion, further reducing carbon emissions and enhancing grid flexibility. The control system also enables dynamic gas turbine operation to ensure a substantially constant power output by supplementing renewable energy and TES steam as necessary.

In certain configurations, the control system is programmed to prioritize continuous power delivery without requiring continuous gas turbine operation. For example, the system may rely on TES and battery storage to meet base load demand, engaging the gas turbine only when system conditions, such as low renewable output, high demand, or battery depletion, necessitate additional thermal input. In this way, the microgrid can achieve a clean energy fraction exceeding 80% even in scenarios with limited grid support.

Optionally, the system may further include an electric battery energy storage system configured to receive charge from either the renewable generation or the power generation system. This battery subsystem can assist with grid balancing, fast frequency response, and load smoothing.

Optionally, during periods in which the gas turbine is offline, the steam turbine continues to operate and is configured to provide grid-forming reliability services. These services may include voltage stabilization, frequency regulation, circuit fault response, and provision of system inertia, functions that are typically challenging to achieve in low-inertia renewable-heavy microgrids.

Optionally, the steam and gas turbines are designed to operate under several modes:
  (a) gas turbine only mode;
  (b) steam turbine only mode powered by the TES system;
  (c) combined operation of gas and steam turbines;
  (d) combined operation with supplemental steam provided by a duct burner in the HRSG; and
  (e) combined operation with supplemental steam from the TES system.

Optionally, a controller is provided to select among these operating modes based on one or more parameters including power demand, real-time renewable electricity availability, current fuel prices, greenhouse gas emissions targets, or battery state-of-charge.

In a further embodiment, the gas turbine may be placed in a standby state during high renewable availability periods (e.g., midday solar peak), while the steam turbine continues to run using TES-supplied steam. This reduces fuel consumption and emissions while still enabling dispatchable output. The steam turbine can operate using steam from the HRSG, from the TES system, or a combination thereof, allowing optimal energy dispatch for fuel savings and emissions reduction.

In at least some implementations, the system architecture can scale to configurations that include two or more gas turbines and HRSGs connected to a single steam turbine. The TES system enables continued steam turbine operation during gas turbine shutdown or maintenance, providing valuable redundancy and resilience.

Optionally, the TES system may be used to supplement steam flow to the steam turbine even when one or more gas turbines are online, increasing overall power output and improving responsiveness to peak demand. During high ambient temperature conditions, which may reduce gas turbine output, the TES system can compensate by supplying additional steam to the steam turbine, thereby maintaining total plant capacity and uninterrupted power delivery.

In a further embodiment, the combined cycle power generation system is configured to enhance responsiveness by integrating a TES system with intelligent steam routing and turbine control logic. The TES system, once charged using heat derived from renewable-sourced or grid-based electricity, provides thermal energy that is used to generate steam. This steam is strategically delivered to various subsystems of the plant to manage and stabilize temperature profiles.

Optionally, a first portion of the TES-generated steam is routed to one or more regions of the HRSG to maintain a predetermined temperature profile, even during gas turbine shutdowns. This thermal stabilization reduces thermal cycling stress and enables faster ramp-up when reactivation is required. Concurrently, a second portion of TES steam is directed to the steam turbine to maintain a minimum operational temperature or spinning state. This configuration preserves readiness and allows the steam turbine to deliver auxiliary grid services or immediately contribute to power generation when demand surges.

In some implementations, a system control module is included and configured to monitor plant and market conditions to determine when to bring the gas turbine online. The predefined system conditions for triggering gas turbine activation include: a drop in renewable energy output below a defined threshold; a TES system thermal output falling below a minimum threshold level; a real-time or forecasted electricity market price exceeding a predetermined level; a command issued by a plant operator or automated grid-management system; or an increase in power demand surpassing a set point.

Optionally, the system is architected with defined steam delivery subsystems for routing TES-generated steam independently to both the HRSG and the steam turbine, along with a programmable control unit that governs the thermal management logic and gas turbine engagement sequencing. This approach ensures that both thermal and operational readiness are maintained across all critical components, enabling rapid, fuel-efficient response to grid signals or market dynamics.

In certain embodiments, the combined cycle power plant is configured for enhanced operational responsiveness by enabling dynamic transitions between two operating modes based on system conditions. The power plant includes a gas turbine, a heat recovery steam generator (HRSG), a steam turbine, and a thermal energy storage (TES) system. In a first operating mode, the steam turbine is maintained in an active operational state using steam produced from thermal energy discharged by the TES system. This configuration allows the plant to deliver electrical power without active combustion in the gas turbine, thereby reducing fuel consumption and emissions while preserving responsiveness.

During this first mode, the steam turbine remains synchronized with the electrical grid. Steam produced from the TES system is used not only to generate mechanical work but also to thermally stabilize the turbine and maintain electrical output that closely matches grid parameters such as voltage, frequency, phase angle, phase sequence, and waveform. This ensures seamless reintegration into full plant operation when additional power is needed.

Upon detection of a change in a predefined system condition, such as but not limited to a drop in renewable energy availability, a surge in power demand, or a price signal from the energy market, the plant transitions to a second operating mode. In this mode, both the gas turbine and the steam turbine are brought online to deliver increased power output. Because the steam turbine is already spinning and synchronized, the gas turbine can be brought online with minimal startup delay, enabling a fast and efficient response to system demand.

Optionally, once the transient condition has resolved or demand has decreased, the gas turbine may be shut down, and the system returns to the first operating mode. The steam turbine remains operational, powered by TES-generated steam, and continues to provide grid-synchronized power output, preserving plant readiness for the next cycle of responsiveness.

The claimable subject matter includes any of the systems or methods in the exemplary claims. Optionally, a method is provided including at least one technical feature from any of the prior features. Optionally, the method includes at least any two technical features from any of the prior features. Optionally, a device is provided including at least one technical feature from any of the prior features. Optionally, the device includes at least any two technical features from any of the prior features. Optionally, the system is provided including at least one technical feature from any of the prior features. Optionally, the system includes at least any two technical features from any of the prior features.

TERMINOLOGY

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic, graphite, or other composition that can generate heat. Optionally, some embodiments may use metal or other thermally conductive conduit(s) that carry molten salt, hot air, hot fluid, hot gas, or other medium for channeling heat through the conduit(s).

Further, the term furnace and reactor can be used interchangeably in the above work meant to signify the reactor of a material processing system which, for example in the case of DRI production, may be referred to as a furnace from art approaches.

Similarly, the terms describing fluid compressions devices (such as, but not limited to, blowers, compressors, fans and pumps) can be used interchangeably.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

While foregoing example implementations may refer to "air", the inventive concept is not limited to this composition, and other fluid streams may be substituted therefor for additional industrial applications, such as but not limited to, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the desired properties and functions; results may vary, depending on the manner and scale of combination of the thermal storage units.

As used in the description herein and throughout the claims that follow, the meaning of "a," "an," and "the" includes plural reference unless the context clearly dictates otherwise. A Iso, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "includes", "including", "comprises", and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The following patent applications and patent are directed to related technologies: U.S. patent application Ser. No. 17/537,407 (filed Nov. 29, 2021; issued as U.S. Pat. No. 11,603,776 on Mar. 14, 2023); and International Patent Application No.: PCT/US2021/061041 (filed Nov. 29, 2021). The foregoing applications and patent are incorporated herein by reference in their entirety for all purposes.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A method of enhancing responsiveness of a combined cycle power generation system including at least one gas turbine, at least one heat recovery steam generator (HRSG), a steam turbine, and a thermal energy storage (TES) system, the method including:
    charging the TES system using heat energy generated from electricity from a renewable energy source and/or an electrical grid;
    using heat output from the TES system to generate steam;
    using a portion of the TES-generated steam to maintain a preselected temperature condition in one or more portions of the HRSG while the gas turbine is in an offline condition;
    using a second portion of the TES-generated steam to operate the steam turbine in a spinning state while the gas turbine is in an offline condition; and
    selectively placing the gas turbine in an online condition in response to detection of a predefined system condition including at least one of: an energy drop from the renewable energy source below an availability threshold, a TES system drop below a heat output threshold level, a real-time or forecast electricity market price increase above a predetermined price threshold level, a command from a system operator, and/or a power demand increase above a demand threshold level.

2. The method of claim 1, further including the steps of maintaining the steam turbine in a reduced-output state and keeping the HRSG warm by the TES system.

3. The method of claim 1, further including the step of selectively operating the TES system to drive the steam turbine within a predetermined power level range in response to detection of the predefined system condition.

4. The method of claim 1, wherein the step of initiating the gas turbine includes operating the gas turbine at or near a design efficiency point in response to detection of the predefined system condition.

5. The method of claim 1, further including the step of selectively delivering steam from the TES system while the at least one gas turbine is in an online condition, thereby producing a higher combined steam flow to the steam turbine, in response to detection of the predefined system condition.

6. The method of claim 1, further including:
    operating a set of control valves to selectively isolate steam sources, including the HRSG and the TES system; and
    routing steam to the steam turbine based on predetermined economic, environmental, and/or operational considerations.

7. The method of claim 6, further including the steps of sparging steam into one or more steam drums of the HRSG to maintain drum temperature, and supplying auxiliary steam to maintain condenser vacuum during periods when the gas turbine is inactive.

8. The method of claim 1, further including the step of maintaining synchronization of the steam turbine to the grid.

9. The method of claim 1, further including the steps of routing intermediate steam from the steam turbine to the TES system, reheating the intermediate steam, and providing the reheated steam to the steam turbine.

10. A power generation system for enhancing responsiveness of a combined cycle power plant, including:
a gas turbine;
a heat recovery steam generator (HRSG) thermally coupled to the gas turbine;
a steam turbine coupled downstream of the HRSG;
a thermal energy storage (TES) system configured to be charged using heat derived from electricity supplied by a renewable energy source and/or an electrical grid;
a steam generation subsystem configured to receive thermal energy output from the TES system and generate steam therefrom;
a first steam delivery pathway configured to route a portion of the steam generated from the TES system to one or more regions of the HRSG;
a second steam delivery pathway configured to supply another portion of the TES-generated steam to the steam turbine;
a control system configured to selectively initiate operation of the gas turbine in response to detection of at least one predefined system condition, the system condition including one or more of: 1) a reduction in energy output from the renewable energy source below an availability threshold, 2) a drop in heat output from the TES system below a predetermined threshold level, 3) an increase in real-time or forecast electricity market prices above a defined price threshold, 4) a command received from a system operator, or 5) an increase in power demand above a defined demand threshold;
wherein the control system is configured to modulate the first steam delivery pathway to maintain a predetermined temperature condition in the HRSG while the gas turbine is in an offline condition;
wherein the control system is configured to regulate the second steam delivery pathway to maintain the turbine in a spinning state while the gas turbine is in an offline condition.

11. The system of claim 10, further including:
the control system configured to operate the steam turbine in a reduced-output state; and
the control system configured to operate the TES system to supply thermal energy to maintain the HRSG in a warm condition during offline periods of the gas turbine.

12. The system of claim 10, wherein the TES system is configured to drive the steam turbine within a predetermined power level range in response to a predefined system condition selected from at least one of: an energy drop from the renewable energy source below an availability threshold, a TES system drop below a heat output threshold level, a real-time or forecast electricity market price increase above a predetermined price threshold level, a command from a system operator, and/or a power demand increase above a demand threshold level.

13. The system of claim 12, wherein the gas turbine is configured to be operated at or near a design efficiency point upon detection of the predefined system condition.

14. The system of claim 10, further including:
a steam routing system configured to deliver steam from the TES system while at least one gas turbine is in an online condition,
wherein the TES-generated steam supplements HRSG steam to produce a higher combined steam flow to the steam turbine in response to the predefined system condition.

15. The system of claim 10, further including:
one or more control valves configured to selectively isolate steam sources including the HRSG and the TES system; and
a steam distribution system configured to route steam to the steam turbine based on one or more of economic, environmental, and operational parameters.

16. The system of claim 15, further including:
a sparging subsystem configured to inject steam into one or more steam drums of the HRSG to maintain drum temperature.

17. The system of claim 10, wherein the control system is configured to maintain the steam turbine synchronized with an electrical grid.

18. The system of claim 10, further including:
a reinjection pathway configured to deliver intermediate steam from the steam turbine to the TES system.

19. A method for clean-energy operation of a microgrid power generation system including at least one gas turbine, at least one heat recovery steam generator (HRSG), a steam turbine, and a thermal energy storage (TES) system with a steam generation subsystem, the method including:
charging the TES system using heat energy generated from electricity from a renewable electricity source and/or an electrical grid;
selectively operating the steam turbine using steam generated from the steam generation subsystem of the TES system to maintain the steam turbine in an operational state while a gas turbine is offline; and
selectively operating the gas turbine so as to maintain a substantially constant power output despite variations in renewable electricity supply and steam availability from the TES system.

20. The method of claim 19, further including the step of providing continuous reliable electric power delivery without continuous gas turbine operation, thereby enabling a clean energy fraction exceeding about 80% for the microgrid power generation system in an islanded or weak-grid-connection configuration.

21. The method of claim 19, wherein the microgrid power generation system further includes an electric battery storage system receiving electricity from the power generation system and/or a renewable electricity source.

22. The method of claim 19, further including:
operating the steam turbine continuously to provide microgrid reliability services, including at least one of: voltage stabilization, frequency regulation, circuit fault response, and system inertia, during periods in which the gas turbine is inactive.

23. The method of claim 19, wherein the gas turbine and steam turbine are operated in at least one of the following configurations:
gas turbine only;
steam turbine only powered by the TES system;
gas turbine and steam turbine simultaneously;
gas turbine and steam turbine with supplemental HRSG steam from a duct burner;
gas turbine and steam turbine with supplemental steam supply from the TES system.

24. The method of claim 23, further including operating a controller configured to select among the operating configurations based on one or more of: power demand, renewable energy availability, fuel cost, emissions targets, or battery charge level.

25. The method of claim 23, wherein the gas turbine is operated in a standby mode during daylight hours when sufficient renewable electricity or battery capacity is available, and the steam turbine continues to operate using thermal energy supplied from the TES system.

26. The method of claim 19, wherein the steam turbine is configured to operate using steam from the HRSG, steam from the TES system, or a combination thereof, based on an optimized dispatch strategy for reducing fuel consumption and emissions.

27. The method of claim 19, wherein the power generation system includes at least two gas turbines, at least two HRSGs, and one steam turbine, and wherein the TES system enables operation of the steam turbine during shutdown or maintenance of at least one gas turbine.

28. The method of claim 19, further including the step of selectively delivering steam from the TES system while the at least one gas turbine is in an online condition, thereby producing a higher combined steam flow to the steam turbine, in response to detection of a predefined system condition.

29. The method of claim 19, further including:
supplying steam from the TES system to the steam turbine during periods when high ambient temperatures reduce gas turbine power output, thereby maintaining plant power capacity and ensuring continuous power delivery.

30. A microgrid power generation system for clean-energy operation, including:
at least one gas turbine;
at least one heat recovery steam generator (HRSG) thermally coupled to the gas turbine;
a steam turbine;
a thermal energy storage (TES) system configured to be charged using heat energy derived from electricity from at least one of a renewable electricity source and an electrical grid;
a steam generation subsystem configured to generate steam using heat output from the TES system; and
a control system configured to: (a) selectively operate the steam turbine using TES-generated steam to maintain the steam turbine in an operational state while the gas turbine is offline, or (b) operate the gas turbine to maintain a substantially constant power output in response to variations in renewable electricity supply and TES system output.

31. The system of claim 30, wherein the control system is further configured to enable continuous electric power delivery without continuous operation of the gas turbine, thereby achieving a clean energy fraction exceeding approximately 80% in an islanded or weak-grid configuration.

32. The system of claim 30, further including an electric battery energy storage system configured to receive electricity from the microgrid power generation system and/or the renewable electricity source.

33. The system of claim 30, wherein the control system is further configured to operate the steam turbine to provide one or more microgrid reliability services selected from: voltage stabilization, frequency regulation, circuit fault response, and provision of system inertia during periods in which the gas turbine is offline.

34. The system of claim 30, wherein the gas turbine and steam turbine are operable in at least one of the following configurations:

(a) gas turbine only;
(b) steam turbine only powered by the TES system;
(c) gas turbine and steam turbine operating simultaneously;
(d) gas turbine and steam turbine with supplemental HRSG steam from a duct burner;
(e) gas turbine and steam turbine with supplemental steam supply from the TES system.

35. The system of claim 34, further including a controller configured to select an operating configuration based on one or more of: power demand, renewable electricity availability, fuel cost, emissions targets, or battery charge level.

36. The system of claim 34, wherein the gas turbine is configured to operate in a standby mode during daylight hours when renewable electricity or battery capacity is sufficient, and the steam turbine continues to operate using steam generated by the TES system.

37. The system of claim 31, wherein the steam turbine is configured to operate using steam from at least one of the HRSG and the TES system, based on an optimized dispatch strategy for reducing fuel consumption and emissions.

38. The system of claim 31, wherein the microgrid power generation system includes at least two gas turbines, at least two HRSGs, and one steam turbine, and the TES system is configured to operate the steam turbine during shutdown or maintenance of at least one gas turbine.

39. The system of claim 31, wherein the TES system is configured to selectively deliver steam to the steam turbine while the at least one gas turbine is online, thereby producing a higher combined steam flow to the steam turbine in response to a predefined system condition.

40. The system of claim 31, wherein the TES system is configured to supply steam to the steam turbine during periods of high ambient temperature, thereby compensating for reduced gas turbine output and maintaining continuous power delivery.

41. A method of enhancing responsiveness of a combined cycle power generation system including a gas turbine, a heat recovery steam generator (HRSG), a steam turbine, and a thermal energy storage (TES) system, the method including:
charging the TES system using heat energy generated from electricity from a renewable energy source and/or an electrical grid;
using heat output from the TES system to generate steam;
using a first portion of the TES-generated steam to maintain a first preselected temperature condition in one or more portions of the HRSG while the gas turbine is in an offline condition; and
using a second portion of the TES-generated steam to maintain a second preselected temperature condition in one or more portions of the steam turbine while the gas turbine is in the offline condition.

42. The method of claim 41, further including the steps of selectively placing the gas turbine in an online condition in response to detection of a predefined system condition including at least one of: an energy drop from the renewable energy source below an availability threshold, a TES system drop below a heat output threshold level, a real-time or forecast electricity market price increase above a predetermined price threshold level, a command from a system operator, and/or a power demand increase above a demand threshold level.

43. A combined cycle power generation system configured to enhance responsiveness, including:
a gas turbine;

a heat recovery steam generator (HRSG) thermally coupled to the gas turbine;

a steam turbine coupled downstream of the HRSG;

a thermal energy storage (TES) system configured to be charged using heat energy derived from electricity supplied by at least one of a renewable energy source and an electrical grid;

a steam generation subsystem configured to generate steam using heat output from the TES system;

a first steam delivery subsystem configured to direct a first portion of the TES-generated steam to one or more portions of the HRSG to maintain a first preselected temperature condition while the gas turbine is in an offline condition;

a second steam delivery subsystem configured to direct a second portion of the TES-generated steam to one or more portions of the steam turbine to maintain a second preselected temperature condition while the gas turbine is in the offline condition; and a control system configured to selectively place the gas turbine in an online condition in response to detection of a predefined system condition.

44. The system of claim 43 wherein the predefined system condition includes at least one of: an energy drop from the renewable energy source below an availability threshold, a TES system drop below a heat output threshold level, a real-time or forecast electricity market price increase above a predetermined price threshold level, a command from a system operator, and/or a power demand increase above a demand threshold level.

* * * * *